(12) United States Patent
Baseeth et al.

(10) Patent No.: US 10,294,376 B2
(45) Date of Patent: May 21, 2019

(54) LECITHIN AND PLASTICIZER COMPOSITIONS AND METHODS

(71) Applicants: Shireen Baseeth, Decatur, IL (US); Teodora R. Tabuena-Salyers, Decatur, IL (US); Bruce Sebree, Oakley, IL (US)

(72) Inventors: Shireen Baseeth, Decatur, IL (US); Teodora R. Tabuena-Salyers, Decatur, IL (US); Bruce Sebree, Oakley, IL (US)

(73) Assignee: Archer Daniels Midland Company, Decatur, IL (US)

( * ) Notice: Subject to any disclaimer, the term of this patent is extended or adjusted under 35 U.S.C. 154(b) by 357 days.

(21) Appl. No.: 14/324,770

(22) Filed: Jul. 7, 2014

(65) Prior Publication Data

US 2016/0002477 A1 Jan. 7, 2016
US 2018/0057699 A9 Mar. 1, 2018

Related U.S. Application Data

(63) Continuation of application No. 12/993,282, filed as application No. PCT/US2009/064171 on Nov. 12, 2009, now Pat. No. 8,772,358.

(Continued)

(51) Int. Cl.
*C09D 7/45* (2018.01)
*C09C 1/24* (2006.01)
(Continued)

(52) U.S. Cl.
CPC .............. *C09D 7/45* (2018.01); *C09B 67/009* (2013.01); *C09B 67/0022* (2013.01);
(Continued)

(58) Field of Classification Search
CPC .......... C09D 7/02; C09D 7/1216; C09D 7/45; C09D 7/20; C09D 7/40; C09D 7/63;
(Continued)

(56) References Cited

U.S. PATENT DOCUMENTS 1,892,576 A * 12/1932 Johnston ................ D21H 19/34
427/258
2,637,621 A * 5/1953 Laszlo ...................... D06P 1/44
523/401

(Continued)

FOREIGN PATENT DOCUMENTS

WO WO 1991/001343 A1 * 2/1991
WO WO 2005/092292 A1 * 10/2005
WO WO 2010/056833 A1 * 5/2010

OTHER PUBLICATIONS

"Differential Scanning Calorimetric Study of HTPB based Composite Propellants in Presence of Nano Feric Oxide", Propellants, Explosives, Pyrotechnics 31, No. 6 (2006).*

(Continued)

*Primary Examiner* — Michael A Salvitti
(74) *Attorney, Agent, or Firm* — Andrew F. Nilles

(57) ABSTRACT

The present disclosure is directed to compositions having lecithin and plasticizer components and related methods. The disclosed compositions may also include one or more co-surfactants such as anionic surfactants and/or non-ionic surfactants.

18 Claims, 18 Drawing Sheets

Related U.S. Application Data

(60) Provisional application No. 61/113,637, filed on Nov. 12, 2008.

(51) Int. Cl.

| | | |
|---|---|---|
| *C09D 7/63* | (2018.01) | |
| *C09C 3/00* | (2006.01) | |
| *C09D 5/02* | (2006.01) | |
| *C09C 1/48* | (2006.01) | |
| *C09C 1/56* | (2006.01) | |
| *C09B 67/00* | (2006.01) | |
| *C09B 67/46* | (2006.01) | |
| *C09D 7/20* | (2018.01) | |
| *C09D 7/40* | (2018.01) | |
| *C08K 3/22* | (2006.01) | |

(52) U.S. Cl.
CPC .......... *C09B 67/0089* (2013.01); *C09C 1/24* (2013.01); *C09C 1/48* (2013.01); *C09C 1/56* (2013.01); *C09C 3/00* (2013.01); *C09D 5/027* (2013.01); *C09D 7/20* (2018.01); *C09D 7/40* (2018.01); *C09D 7/63* (2018.01); *C01P 2006/22* (2013.01); *C01P 2006/62* (2013.01); *C01P 2006/63* (2013.01); *C01P 2006/64* (2013.01); *C08K 2003/2241* (2013.01)

(58) Field of Classification Search
CPC ....... C09D 5/027; C08C 3/00; C09B 67/0089; C09B 67/009; C09B 67/0022; C09C 1/24; C09C 1/48; C09C 1/56; C09C 3/00; C08K 2003/2241; C01P 2006/63; C01P 2006/64; C01P 2006/22; C01P 2006/62
See application file for complete search history.

(56) References Cited

U.S. PATENT DOCUMENTS

| | | | | |
|---|---|---|---|---|
| 3,210,209 A * | 10/1965 | Jones | ............. | C09B 67/0085 106/253 |
| 3,247,158 A * | 4/1966 | Alford | ............. | C08J 9/32 524/143 |
| 3,295,486 A * | 1/1967 | Simons | ............. | B21D 51/44 413/19 |
| 3,479,195 A * | 11/1969 | Parkinson | ............. | C09D 5/06 106/124.4 |
| 4,251,276 A * | 2/1981 | Ferree, Jr. | ............. | B41M 5/385 400/241 |
| 4,654,081 A * | 3/1987 | Dalzell | ............. | C09D 10/00 106/31.93 |
| 4,773,778 A * | 9/1988 | Pietsch | ............. | B41J 31/02 400/241.1 |
| 5,017,421 A * | 5/1991 | Hotta | ............. | B41M 5/363 428/216 |
| 5,124,412 A * | 6/1992 | Catena | ............. | C08G 69/34 525/420.5 |
| 5,188,765 A * | 2/1993 | Ehrhardt | ............. | B41M 5/10 106/14.5 |
| 5,338,761 A * | 8/1994 | Nakajima | ............. | A61K 9/1075 514/772 |
| 5,902,513 A * | 5/1999 | Shimizu | ............. | H01F 1/445 252/62.52 |
| 6,087,305 A * | 7/2000 | Kober | ............. | A01N 37/04 504/189 |
| 6,248,793 B1 * | 6/2001 | Severtson | ............. | B01D 17/047 162/4 |
| 6,248,806 B1 * | 6/2001 | Codolar | ............. | C09D 5/1656 106/15.05 |
| 6,287,377 B1 * | 9/2001 | Binns | ............. | C09B 67/006 106/401 |
| 6,402,861 B1 * | 6/2002 | Katano | ............. | C22C 21/00 148/551 |
| 6,523,477 B1 * | 2/2003 | Brooks | ............. | F42B 39/20 102/481 |
| 6,548,558 B2 * | 4/2003 | Severtson | ............. | B01D 17/047 162/4 |
| 6,627,665 B2 * | 9/2003 | Waldron | ............. | A01N 43/40 106/18.33 |
| 6,916,390 B2 * | 7/2005 | Augier | ............. | C06B 45/10 149/109.6 |
| 2001/0041749 A1 * | 11/2001 | Severtson | ............. | B01D 17/047 516/39 |
| 2002/0103285 A1 * | 8/2002 | Jordan | ............. | C08K 3/34 524/451 |
| 2003/0073749 A1 * | 4/2003 | Waldron | ............. | A01N 43/40 516/78 |
| 2006/0207476 A1 * | 9/2006 | Coward | ............. | C09C 1/22 106/447 |
| 2007/0142502 A1 * | 6/2007 | Zhu | ............. | C09D 10/00 523/161 |
| 2014/0066347 A1 * | 3/2014 | Baseeth | ............. | A61Q 1/02 508/428 |

OTHER PUBLICATIONS

"Polyurethane Binder Systems for Polymer Bonded Explosives", Australian Government Department of Defence, Defence Science and Technology Organisation DSTO-GD-0492 (Dec. 2006).*
PCT International Search Report, Mail Stop PCT, Attn: ISA/US, Commissioner for Patents P.O. Box 1450 Alexandria, VA, dated Jan. 15, 2010, Lee W. Young.*
PCT Written Opinion, Mail Stop PCT, Attn: ISNUS, Commissioner for Patents P.O. Box 1450 Alexandria, VA, dated Jan. 15, 2010, Lee W. Young.*
Hammond et al., 2.13 Soybean Oil, Bailey's Industrial Oil and Fat Products, vol. 2 (6th Edition) Edited Fereidoon Shahidi (2005), John Wiley & Sons, pp. 577-585, (Downloaded Jan. 23, 2013), Online @ http://www.knovel.com/web/portal/browse/display?_EXT_KNOVEL_DISPLAY bookid=1432&Verticall D=O.*
O'Neil, Maryadele J. et al. (@2006, 2010), The Merck Index—An Encyclopedia of Chemicals, Drugs, and Biologicals (14th Ed.—Vers 14.6), Merck Sharp & Dohme Corp., Whitehouse Station, NJ (Knovel Date: Dec. 1, 2007), Entries lecithin, soybean oil, Online @ http://knovel.com/web/portal/browse/display?_EXT_KNOVEL_DISPLAY bookid=1863&VerticalID=0.*
Lewis, Richard J., Sr. (2002), Hawley's Condensed Chemical Dictionary (14th Edition). John Wiley & Sons, Online @ http://app.knovel.com/hotlink/toc/id:kpHCCDE006/hawleys-condensed-chemical, Headword = ascorbyl palmitate, DBP, dibutyl phthalate, isopropyl palmitate, lecithin; pp. 1-2 (Knovel Release Date: Sep 4, 2003, downloaded Oct. 23, 2013).*
Ash, Michael Ash, Irene (2005; 2008). Handbook of Industrial Surfactants (4th Edition). Synapse Information Resources, Inc.. Online @ http://app.knovel.com/hotlink/toc/id:kpHISE000G/handbook-industrial-surfactants, (Knovel Release Date: Mar. 6, 2009; downloaded Oct. 23, 2013), pp. 2450-2451.*

* cited by examiner

Example 9

Example 9   E-SPERSE 100

Example 3    E-SPERSE 100

LECITHIN AND PLASTICIZER COMPOSITIONS AND METHODS

CROSS-REFERENCE TO RELATED APPLICATIONS

This application is a continuation of pending U.S. patent application Ser. No. 12/993,282, filed Nov. 18, 2010, issued as U.S. Pat. No. 8,772,358 on Jul. 8, 2014, which itself claimed priority to International Application No. PCT/US09/64171, filed Nov. 12, 2009, which itself claimed priority to U.S. Provisional Patent Application No. 61/113,637, filed Nov. 12, 2008, each of the contents of the entirety of which are incorporated by this reference.

TECHNICAL FIELD

The present invention relates generally to dispersants. The present disclosure is directed to compositions comprising lecithin and plasticizers. The present disclosure is also directed to methods for the preparation and use of compositions comprising lecithin and plasticizers.

BACKGROUND ART

Lecithin is a lipid substance found in animal and plant tissues such as, for example, egg yolk and soy bean. Lecithin is composed of various constituents including, but not limited to, phospholipids, such as, for example, phosphatidyl choline ("PC"), phosphatidyl inositol ("PI"), and phosphatidyl ethanolamine ("PE"). The amphiphilic properties of lecithin make the substance an effective processing aid, emulsifier, dispersant and/or surfactant in various applications.

By way of example, lecithin may be used in applications where modification of the boundary layer between substances is desirable. In the presence of immiscible liquid phases, lecithin can reduce the interfacial surface tension and function as an emulsifier. When used with two or more solid phases, lecithin can function as a lubricant and/or release agent.

DISCLOSURE OF INVENTION

Certain embodiments disclosed herein are directed to compositions that comprise a lecithin and a plasticizer. In another embodiment, a method comprises mixing lecithin with a plasticizer. In other embodiments, uses of the compositions as dispersants are disclosed.

It should be understood that this disclosure is not limited to the embodiments disclosed in this Summary, and it is intended to cover modifications that are within the spirit and scope of the invention, as defined by the claims.

BRIEF DESCRIPTION OF THE DRAWINGS

The characteristics and advantages of the present disclosure may be better understood by reference to the accompanying figures.

MODES FOR CARRYING OUT THE INVENTION

Figure 1:
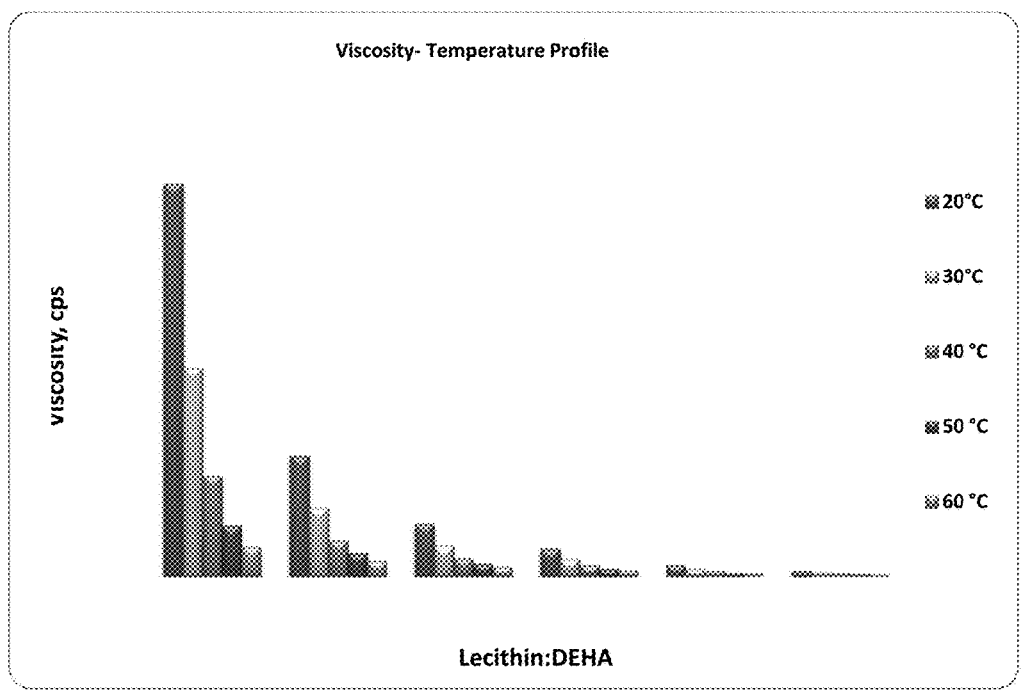
FIG. 1 is a graph presenting viscosity-temperature profiles for various blends of lecithin and di-(2-ethylhexyl) adipate.

In the present application, including the claims, other than in the operating examples or where otherwise indicated, all numbers expressing quantities or characteristics are to be understood as being modified in all instances by the term "about". Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

The embodiments disclosed herein are directed to compositions and methods that comprise a lecithin and a plasticizer. In various embodiments, the composition is a blend of lecithin in amounts ranging from 5% to 95% by weight of the disclosed compositions, and in certain embodiments from 70% to 95%; and the plasticizer in amounts ranging from 5% to 95% by weight of the disclosed compositions, and in certain embodiments from 5% to 30%.

It has been found that the combination of lecithin and one or more plasticizers results in a compositions having reduced viscosity compared to conventional lecithin, particularly in aqueous systems. Mixing the lecithin with a plasticizer is in a manner more efficient as compared to a viscosity reduction done by mixing the lecithin with triglycerides. This reduction in viscosity allows for increased applicability of lecithin as a dispersant in both aqueous and non-aqueous systems. The disclosed lecithin-plasticizer compositions may be engineered to provide a desirable viscosity profile for numerous applications, such as, for example, pigment dispersion vehicles in paints, inks, and other coatings. In various embodiments, the disclosed lecithin-plasticizer compositions have a viscosity of less than 3000 centipoise. In various embodiments, the disclosed lecithin-plasticizer compositions have a viscosity of less than 2000 centipoise, less than 500 centipoise, or less than 100 centipoise. The reduced viscosity of the composition of the present invention also enables the lecithin-plasticizer composition to have a higher loading capacity for pigment as compared to conventional dispersants in that more pigment can be dispersed in an equal volume of the lecithin-plasticizer composition of the present invention as compared to an equivalent amount of a conventional dispersant.

Lecithins suitable for use in the disclosed compositions and methods include, but are not limited to, crude filtered lecithin, fluid lecithin, de-oiled lecithin, chemically and/or enzymatically modified lecithin, standardized lecithin, and blends of any thereof. Lecithins employed in the present disclosure generally tend to have a hydrophilic-lipophilic balance ("HLB") value ranging from 1.0 to 10.0 depending on the processing conditions and additives used to obtain the lecithin and produce the lecithin product. For example, crude filtered lecithin has an HLB value of approximately 4.0 and favors the formation of water-in-oil emulsions. Standardized lecithin includes co-emsulifiers having HLB values ranging from 10.0 to 24.0, which results in lecithin compositions having HLB values of 7.0 to 12.0 and favoring oil-in-water emulsions. Any lecithin or combinations of lecithins are suitable for use in the disclosed compositions and methods regardless of the initial HLB value of the lecithin. Lecithins useful in the disclosed compositions and methods may comprise co-emulsifiers having a hydrophilic-lipophilic balance value ranging from 10.0 to 24.0, and in certain embodiments 10.0 to 18.0.

The emulsifier and/or surfactant properties of an amphiphilic substance such as lecithin, for example, may be predicted at least in part by the hydrophilic-lipophilic balance ("HLB") value of the substance. The HLB value may function as an index of the relative preference of an amphiphilic substance for oil or water—the higher the HLB value, the more hydrophilic the molecule; the lower the HLB value, the more hydrophobic the molecule. A description of HLB values is provided in U.S. Pat. No. 6,677,327, which is incorporated by reference herein in its entirety. HLB is also described in Griffin, "Classification of Surface-Active Agents by 'HLB,'" *J. Soc. Cosmetic Chemists* 1 (1949); Griffin, "Calculation of HLB Values of Non-Ionic Surfactants," *J. Soc. Cosmetic Chemists* 5 (1954); Davies, "A quantitative kinetic theory of emulsion type, I. Physical chemistry of the emulsifying agent," *Gas/Liquid and Liquid/Liquid Interfaces, Proceedings of the 2d International Congress on Surface Activity* (1957); and Schick, "Nonionic Surfactants: Physical Chemistry", Marcel Dekker, Inc., New York, N.Y., pp. 439-47 (1987), each of which is incorporated by reference herein in its entirety.

In various embodiments, the plasticizer used in the disclosed compositions and methods may be selected from the group consisting of a bio-based plasticizer, a citrate, an adipate, a pentaerythritol ester, an isosorbide ester, medium chain triglycerides, a polyglyercol ester, and combinations of any thereof. Substances of a bio-derived origin are derived from biological materials as opposed to being derived from petrochemical sources. Bio-derived substances may be differentiated from petroleum derived substances by their carbon isotope ratios using ASTM International Radio-isotope Standard Method D 6866. As used herein, the term "bio-derived" refers to being derived from or synthesized by a renewable biological feedstock, such as, for example, an agricultural, forestry, plant, fungal, bacterial, or animal feedstock.

Various agencies have established certification requirements for determining bio-derived content. These methods require the measurement of variations in isotopic abundance between bio-derived products and petroleum derived products, for example, by liquid scintillation counting, accelerator mass spectrometry, or high precision isotope ratio mass spectrometry. Isotopic ratios of the isotopes of carbon, such as the $^{13}C/^{12}C$ carbon isotopic ratio or the $^{14}C/^{12}C$ carbon isotopic ratio, can be determined using isotope ratio mass spectrometry with a high degree of precision. Studies have shown that isotopic fractionation due to physiological processes, such as, for example, $CO_2$ transport within plants during photosynthesis, leads to specific isotopic ratios in natural or bio-derived compounds. Petroleum and petroleum derived products have a different $^{13}C/^{12}C$ carbon isotopic ratio due to different chemical processes and isotopic fractionation during the generation of petroleum. In addition, radioactive decay of the unstable $^{14}C$ carbon radioisotope leads to different isotope ratios in bio-derived products compared to petroleum products. Bio-derived content of a product may be verified by ASTM International Radioisotope Standard Method D 6866. ASTM International Radioisotope Standard Method D 6866 determines bio-derived content of a material based on the amount of bio-derived carbon in the material or product as a percent of the weight (mass) of the total organic carbon in the material or product. Bio-derived products will have a carbon isotope ratio characteristic of a biologically derived composition.

Bio-derived materials offer an attractive alternative for industrial manufacturers looking to reduce or replace their reliance on petrochemicals and petroleum derived products. The replacement of petrochemicals and petroleum derived products with products and/or feed stocks derived from biological sources (i.e., bio-based products) offer many advantages. For example, products and feed stocks from biological sources are typically a renewable resource. In most instances, bio-derived chemicals and products formed therefrom are less burdensome on the environment than petrochemicals and products formed from petrochemicals. As the supply of easily extracted petrochemicals continues to be depleted, the economics of petrochemical production will likely force the cost of the petrochemicals and petroleum derived products to higher prices compared to bio-based products. In addition, companies may benefit from the marketing advantages associated with bio-derived products from renewable resources in the view of a public becoming more concerned with the supply of petrochemicals.

In various embodiments, plasticizers suitable for use in the disclosed compositions and methods include, but are not limited to, di-(2-ethylhexyl) adipate, dioctyl adipate, propylene glycol monoester, butyl benzyl phthalate, di-n-butyl maleate, di-n-butyl phthalate, diethylene glycol dibenzoate, di(2-ethylhexyl) phthalate, dioctyl phthalate, diethyl phthalate, diisobutyl phthalate, diisodecyl adipate, diisodecyl phthalate, diisoheptyl phthalate, diisononyl adipate, diisononyl cyclohexane-1,2-dicarboxylate, diisononyl phthalate, diisooctyl adipate, diisooctyl phthalate, dimenthyl phthalate, di-n-hexyl phthalate, di-n-octyl adipate, di-n-octyl phthalate, dinonyl phthalate, dioctyl maleate, dioctyl sebacate, dioctyl terephalate, dioctyl azelate, dipropylene glycol dibenzoate, di(2-propylheptyl) phthalate, ditridecyl adipate, ditridecyl phthalate, diundecyl phthalate, 2-ethylhexanol, epoxidized linseed oil, epoxidized soybean oil, general-purpose phthalate, isodecyl alcohol, isononyl alcohol, phthalic anhydride, 2-propylheptanol, polyvinyl chloride, tricresyl phosphate, triisononyl trimellitate, triisooctyl trimellitate, trimellitic anhydride, trioctyl trimellitate, triphenyl phosphate, trixylyl phosphate, undecyl dodecyl phthalate, and combinations of any thereof. In various embodiments, the plasticizer comprises di-(2-ethylhexyl) adipate ("DEHA").

As used herein, the term "DEHA" includes di-(2-ethylhexyl) adipate. DEHA is also referred to as dioctyl adipate or "DOA" in the art. As used herein, unless otherwise indicated, dioctyl adipate ("DOA") refers to the ester of adipic acid and linear n-octanol.

DEHA

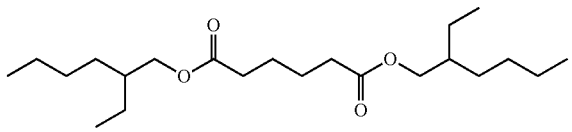 [SMILES: CCCCC(CC)COC(=O)CCCCC(=O)OCC(CC)CCCC]

It is also important to note that both moieties may be used as plasticizers—alone, together, or in combination with other plasticizers—in various embodiments described herein.

In various embodiments, the disclosed compositions may also comprise one or more co-surfactants. The one or more co-surfactants may comprise one or more cationic surfactants, one or more anionic surfactants, one or more non-ionic surfactants, or combinations of one or more of the cationic surfactants, the anionic surfactants and the non-ionic surfactants. In various embodiments, the co-surfactant or co-surfactant combinations may have a hydrophilic-lipophilic balance ranging from 10.0 to 24.0, and in some embodiments from 10.0 to 18.0. In various embodiments, the lecithin may comprise from 5% to 95% by weight of the disclosed composition, in some embodiments from 60% to 90%, and in other embodiments from 80% to 90%; the plasticizer may comprise from 1% to 20% by weight of the disclosed composition, in some embodiments from 5% to 15%, and in other embodiments from 5% to 10% or 10% to 15%; and the co-surfactant may comprise from 2% to 20% by weight of the composition, in some embodiments from 5% to 15%, and in other embodiments from 10% to 15%.

Anionic surfactants suitable for use in the disclosed compositions and methods include, but are not limited to, sodium and potassium salts of straight-chain fatty acids, polyoxyethylenated fatty alcohol carboxylates, linear alkyl benzene sulfonates, alpha olefin sulfonates, sulfonated fatty acid methyl ester, arylalkanesulfonates, sulfosuccinate esters, alkyldiphenylether(di)sulfonates, alkylnaphthalenesulfonates, isoethionates, alkylether sulfates, sulfonated oils, fatty acid monoethanolamide sulfates, polyoxyethylene fatty acid monoethanolamide sulfates, aliphatic phosphate esters, nonylphenolphosphate esters, sarcosinates, fluorinated anionics, anionic surfactants derived from oleochemicals, and combinations of any thereof. In various embodiments, the surfactant comprises an anionic surfactant, such as, for example, a phosphate ester.

Non-ionic surfactants suitable for use in the disclosed compositions and methods include, but are not limited to, sorbitan monostearate, polyoxyethylene ester of rosin, polyoxyethylene dodecyl mono ether, polyoxyethylene-polyoxypropylene block copolymer, polyoxyethylene monolaurate, polyoxyethylene monohexadecyl ether, polyoxyethylene monooleate, polyoxyethylene mono(cis-9-octadecenyl) ether, polyoxyethylene monostearate, polyoxyethylene monooctadecyl ether, polyoxyethylene dioleate, polyoxyethylene distearate, polyoxyethylene sorbitan monolaurate polyoxyethylene sorbitan monooleate, polyoxyethylene sorbitan monopalmitate, polyoxyethylene sorbitan monostearate, polyoxyethylene sorbitan trioleate, polyoxyethylene sorbitan tristearate, polyglycerol ester of oleic acid, polyoxyethylene sorbitol hexastearate, polyoxyethylene monotetradecyl ether, polyoxyethylene sorbitol hexaoleate, fatty acids, tall-oil, sorbitol hexaesters, ethoxylated castor oil, ethoxylated soybean oil, rapeseed oil ethoxylate, ethoxylated fatty acids, ethoxylated fatty alcohols, ethoxylated polyoxyethylene sorbitol tetraoleate, glycerol and polyethylene glycol mixed esters, alcohols, polyglycerol esters, monoglycerides, sucrose esters, alkyl polyglycosides, polysorbates, fatty alkanolamides, polyglycol ethers, derivatives of any thereof, and combinations of any thereof. In various embodiments, the surfactant comprises a non-ionic surfactant, such as, for example, a fatty acid ethoxylate.

Cationic surfactants suitable for use in the present invention include, but are not limited to fatty amine salts; fatty alkyl quaternary amines including primary, secondary and tertiary amines; ester amines and the corresponding ethoxylated ester amines; and combinations of any thereof.

In various embodiments, the disclosed compositions and methods may comprise lecithin, a plasticizer, a cationic surfactant, an anionic surfactant and a non-ionic surfactant. In various embodiments, the plasticizer may comprise di-(2-ethylhexyl) adipate, the anionic surfactant may comprise a phosphate ester, and the non-ionic surfactant may comprise a fatty acid ethoxylate. In various embodiments, the anionic surfactant and the non-ionic surfactant may be present in the disclosed composition in a weight ratio ranging from 1:9 to 9:1. The anionic surfactant may comprise 1% to 10% by weight of the disclosed composition, and in some embodiments from 3% to 7%; and the non-ionic surfactant may comprise 1% to 10% by weight of the disclosed composition, and in some embodiments from 3% to 7%. In various embodiments, the disclosed composition comprises 3% anionic surfactant and 7% non-ionic surfactant by weight of the composition.

The combination of lecithin and a plasticizer results in a composition having reduced viscosity as compared to conventional lecithin. The reduction in viscosity increases the applicability of the composition as a processing aid, emulsifier, dispersant and/or surfactant in various applications, such as, for example, in paints, inks, and other coating compositions. Embodiments comprising lecithin, a plasticizer, and a surfactant find utility in aqueous systems, where the low viscosity composition is water dispersible and the surfactant aids in the aqueous stabilization of the lecithin-plasticizer blend. In various embodiments, the combined use of an anionic surfactant and a non-ionic surfactant in the disclosed compositions may further aid in the stabilization of the lecithin-plasticizer blend in aqueous systems.

In various embodiments, the disclosed water dispersible lecithin-plasticizer compositions find utility in water-based coatings, including, but not limited to, latex paints. In various embodiments, the disclosed compositions may be used as dispersion vehicles for pigments in paint or ink formulations. The pigment may be selected from the group consisting of an organic pigment, an inorganic pigment, a carbon black pigment or any combinations thereof. In various embodiments, the disclosed compositions advantageously aid in pigment processing, including, but not limited to, grinding, milling and release aids, which may contribute to improved gloss, colorant and body in pigmented formulations. The low viscosity of the disclosed compositions provides improved coating uniformity to pigments and other particulates in dispersions. In this context, among others, the disclosed compositions provide improved dispersant, wetting agent, and/or stabilizer properties and performance.

In various other embodiments, the disclosed compositions may be used in magnetic fluid applications. In one embodiment, the disclosed compositions may be used to stabilize magnetic particles in a solvent base, including, but not limited to, a mixture of a base oil and an ester compound.

The improved wetting and dispersant properties of the disclosed compositions result in reduced agglomeration of the suspended particles in magnetic fluids without resulting in adverse effects on the viscosity of the fluid.

The disclosed compositions may also be used in nanotechnology applications. In one embodiment, the disclosed compositions may be used as a dispersant, wetting agent, solubilizer, and/or stabilizer in nanoparticle suspensions. Additional applications for the disclosed compositions and methods include, but are not limited to, use in fiberglass, concrete, ceramics, plastics, and composites. Additional uses of the disclosed compositions include, but are not limited to, uses as textile auxiliary agents, leather finishing agents, plastic compounding agents, lubricants, oilfield drilling additives, emollients, film-formers, and mold release agents.

In addition to the multiple functionalities of the disclosed compositions as a dispersant, wetting agent, solubilizer, and/or stabilizer in various applications, the disclosed compositions also contain low or no volatile organic compounds ("VOCs"). Low VOC paints, inks, and other surface coatings may use water as a carrier instead of petroleum-based solvents. As such, the levels of harmful emissions are lower than solvent-borne surface coatings. However, dispersion of pigments and other colorants may be more difficult in aqueous-based coating systems as compared to petroleum-based systems. The disclosed compositions, therefore, may be used in low VOC coating formulations to improve pigment and colorant dispersion without contributing undesirable VOCs to the compositions.

In order to meet EPA standards, paints, inks and other surface coatings must not contain VOCs in excess of 200 grams per liter. Generally, low VOC surface coatings usually meet a 50 g/L VOC threshold. For example, paints with the Green Seal Standard (GS-11) mark are certified lower than 50 g/L (for flat sheen) or 150 g/L (for non-flat sheen). Surface coatings containing VOCs in the range of 5 g/L or less according to the EPA Reference Test Method 24 may be called "Zero VOC."

In various embodiments, the compositions disclosed herein have less than 25 grams of VOCs per liter of composition. In various embodiments, the compositions disclosed herein have VOC levels of less than 5 g/L, less than 1 g/L, or less than 0.5 g/L. In various embodiments, the compositions disclosed herein may be used as low-VOC bio-derived dispersants, wetting agents, solubilizers, and/or stabilizers.

The embodiments disclosed herein are also directed to methods of preparing the disclosed compositions. In various embodiments, lecithin is heated to a temperature above ambient temperature, a plasticizer is added to the lecithin at the elevated temperature, and the plasticizer and lecithin are mixed together to form a lecithin-plasticizer blend. The blend is cooled to ambient temperature. The resulting blend has a viscosity lower than the lecithin ingredient alone, which may be less than 3000 cP. In various embodiments, the viscosity of the lecithin-plasticizer blend may be less than 2000 cP, less than 500 cP, or less than 100 cP. In various other embodiments, one or more co-surfactants may be added to the lecithin either before or simultaneously with one or more plasticizers. The one or more co-surfactants may alternatively be added to the blend of the lecithin and the one or more plasticizers.

The embodiments disclosed herein are also directed to methods of using the disclosed compositions. In various embodiments, the disclosed compositions are used to aid in the dispersion or wetting of an ingredient in a formulation such as, for example, concrete, ceramic, fiberglass, plastic, ink, paint, or other coating. The disclosed compositions are mixed into the formulation to disperse or wet at least one ingredient, such as, for example, a pigment. In various embodiments, the disclosed compositions comprise low-VOC bio-derived additives for use in a variety of formulations.

As illustrated herein, the disclosed compositions are suitable for formulating solvent and water based paints, inks, and other coating systems. The amphiphilic properties of the disclosed compositions allows for their use as good wetting and stabilizing agents for both organic and inorganic pigments. The disclosed compositions are also suitable for a wide variety of pigment concentrates. In various embodiments, as illustrated herein, the disclosed compositions are added as a grinding aid in pigment dispersion processes during formulation of paints, inks and other coating systems.

In various embodiments, as illustrated herein, the disclosed compositions may function as low-VOC dispersants exhibiting low-grind viscosity, high pigment load, low foam, high color development, and fast dispersion/wetting. In various embodiments, the disclosed compositions may comprise an emulsifier blend free of alkyl phenol ethoxylates.

EXAMPLES

The following exemplary, non-limiting examples are provided to further describe the embodiments presented herein. Those having ordinary skill in the art will appreciate that variations of these Examples are possible within the scope of the invention.

Example 1

A series of blends of crude filtered lecithin (YELKIN® T, Archer Daniels Midland Company, Decatur, Ill., USA) and di-(2-ethylhexyl) adipate ("DEHA") (PLASTOMOLL® DOA, BASF, North Mount Olive, N.J., USA) were prepared in the following weight ratios (lecithin:DEHA): 95:5; 90:10; 85:15; 80:20; 70:30; 60:40. The blends were prepared by heating the lecithin in a beaker to approximately 60° C. under constant stirring. As the crude lecithin began to melt, the DEHA was added and the mixture was stirred at 60° C. for approximately one hour. The blends were cooled to ambient temperature (approximately 25° C.). The blends were free-flowing liquids at ambient temperature.

Example 2

Figure 2A:
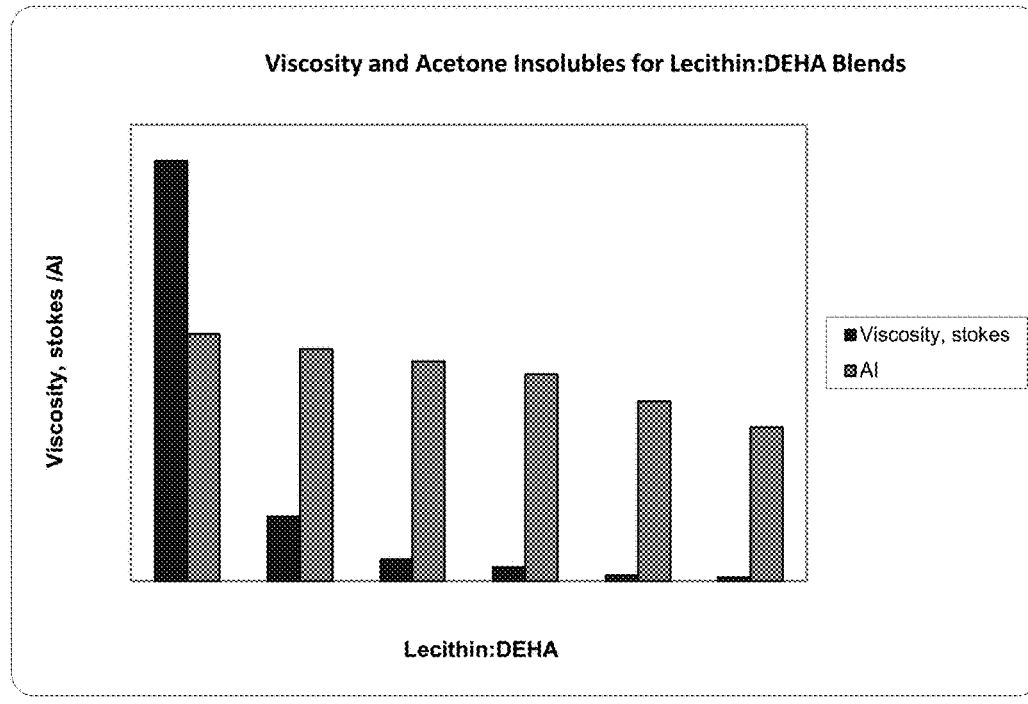
FIG. 2A is a graph presenting values for viscosity and acetone insolubles for various blends of lecithin and di-(2-ethylhexyl) adipate.
Figure 2B:
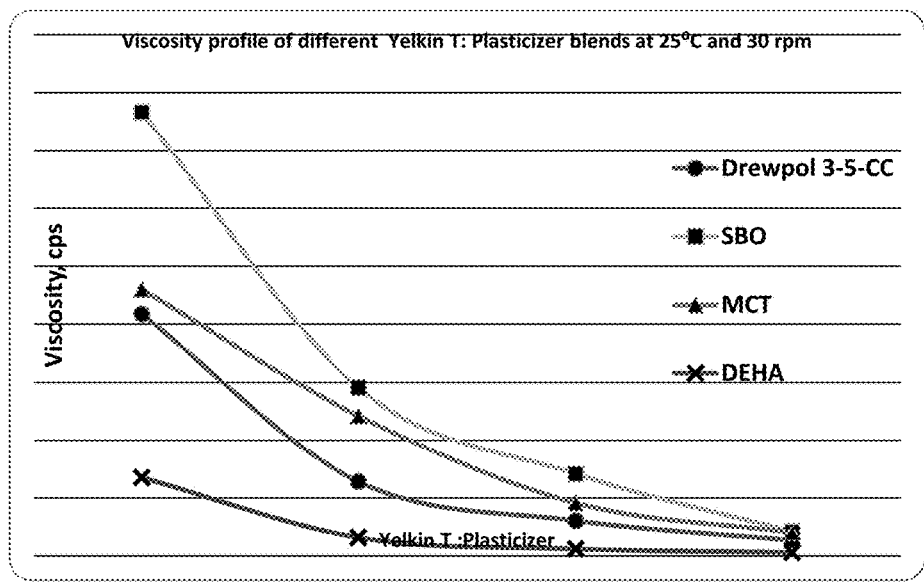
FIG. 2B Viscosity profile of YELKIN T (lecithin of plastic viscosity) in presence of different plasticizers at 25° C.

A viscosity-temperature profile was measured for all blend ratios prepared in Example 1. The results of the profile are presented in FIG. 1. The blends were also analyzed for viscosity and acetone insolubles. The results of the analyses are presented FIG. 2a. The crude filtered lecithin (YELKIN® T, Archer Daniels Midland Company, Decatur, Ill., USA) was used to make blends of various ratios such as (90:10, 80:20, 70:30 and 60:40) with different plasticizers like Soybean oil (SBO), Medium Chain Triglycerides also referred as MCT (NEOBEE® 1053, Stepan Company, Northfield, Ill., USA) and DREWPOL 3-5-CC(Stepan Company, Northfield, Ill., USA) along with di-(2-ethylhexyl) adipate ("DEHA") (PLASTOMOLL® DOA, BASF, North Mount Olive, N.J., USA). The viscosity of these blends were measured at 25° C. as shown in FIG. 2b. The viscosity of lecithin is not shown in the figure as it was of plastic viscosity.

Example 3

A blend of crude filtered lecithin (YELKIN® T, Archer Daniels Midland Company, Decatur, Ill., USA), DEHA (PLASTOMOLL® DOA, BASF, North Mount Olive, N.J., USA), and a tall fatty acid ethoxylate surfactant (NINEX® MT-610, Stepan Company, Northfield, Ill., USA) was prepared. The blend was 80% lecithin, 10% DEHA, and 10% fatty acid ethoxylate. The blend was prepared by heating the lecithin in a beaker to approximately 50° C. under constant stirring. As the crude lecithin began to melt, the DEHA and fatty acid ethoxylate were added and the mixture was stirred at 60° C. for approximately one hour. The blend was cooled to ambient temperature (approximately 25° C.). The blend was a free-flowing liquid at ambient temperature having a transparent amber color and a viscosity of approximately 16 stokes at 25° C. The blend was dispersible in water.

Example 4

A blend of crude filtered lecithin (YELKIN® T, Archer Daniels Midland Company, Decatur, Ill., USA), DEHA (PLASTOMOLL® DOA, BASF, North Mount Olive, N.J., USA), and a tall fatty acid ethoxylate surfactant (NINEX® MT-610, available from Stepan Company, Northfield, Ill., USA) was prepared. The blend was prepared by heating the lecithin in a beaker to approximately 50° C. under constant stirring and adding the fatty acid ethoxylate in a weight ratio of 90:10 (lecithin:surfactant) to form an intermediate blend. The intermediate blend was mixed with DEHA in a weight ratio of 90:10 (intermediate blend:DEHA) under constant stirring at 50° C. for approximately one hour to form a final blend. The final blend was a free-flowing liquid at ambient temperature having a transparent amber color and a viscosity of 16.8 stokes at 25° C. The final blend was dispersible in water.

Example 5

A blend of crude filtered lecithin (YELKIN® T, Archer Daniels Midland Company, Decatur, Ill., USA), DEHA (PLASTOMOLL® DOA, BASF, North Mount Olive, N.J., USA), and a tall fatty acid ethoxylate surfactant (NINEX® MT-610, Stepan Company, Northfield, Ill., USA) was prepared. The blend was prepared by heating the lecithin in a beaker to approximately 50° C. under constant stirring and adding the DEHA in a weight ratio of 90:10 (lecithin:DEHA) to form an intermediate blend. The intermediate blend was then mixed with the fatty acid ethoxylate in a weight ratio of 90:10 (intermediate blend:surfactant) under constant stirring at 50° C. for approximately one hour to form a final blend. The final blend was a free-flowing liquid at ambient temperature having a transparent amber color and a viscosity of 12.8 stokes at 25° C. The final blend was dispersible in water.

Example 6

A blend of crude filtered lecithin (YELKIN® T, Archer Daniels Midland Company, Decatur, Ill., USA) and unsaturated propylene glycol monoester (PGME, Archer Daniels Midland Company, Decatur, Ill., USA) was prepared. The blend was 90% lecithin and 10% PGME by weight. The blend was prepared by mixing the lecithin and the PGME and heating the mixture to 50° C. under constant stirring for 30 to 60 minutes. The blend was cooled to ambient temperature (approximately 25° C.). The blend was a free-flowing liquid at ambient temperature having a viscosity of approximately 14.9 stokes at 25° C.

Example 7

A blend of crude filtered lecithin (YELKIN® T, Archer Daniels Midland Company, Decatur, Ill., USA), DEHA (PLASTOMOLL® DOA, BASF, North Mount Olive, N.J., USA), and a tall fatty acid ethoxylate surfactant (NINEX® MT-610, Stepan Company, Northfield, Ill., USA) was prepared. The blend was 80% lecithin, 10% DEHA, and 10% surfactant by weight. The blend was prepared by mixing the lecithin, DEHA, and surfactant and heating the mixture to 50° C. under constant stirring for 30 to 60 minutes. The blend was cooled to ambient temperature (approximately 25° C.). The blend was a free-flowing liquid at ambient temperature. The blend was water dispersible.

Example 8

A blend of crude filtered lecithin (YELKIN® T, Archer Daniels Midland Company, Decatur, Ill., USA), DEHA (PLASTOMOLL® DOA, BASF, North Mount Olive, N.J., USA), and a phosphate ester surfactant (STEPFAC™ 8170, Stepan Company, Northfield, Ill., USA) was prepared. The blend was 80% lecithin, 10% DEHA, and 10% surfactant by weight. The blend was prepared by mixing the lecithin, DEHA, and surfactant and heating the mixture to 50° C. under constant stirring for 30 to 60 minutes. The blend was cooled to ambient temperature (approximately 25° C.). The blend was a free-flowing liquid at ambient temperature. The blend was water dispersible.

Example 9

A blend of crude filtered lecithin (YELKIN® T, Archer Daniels Midland Company, Decatur, Ill., USA), DEHA (PLASTOMOLL® DOA, BASF, North Mount Olive, N.J., USA), a tall fatty acid ethoxylate surfactant (NINEX® MT-610, Stepan Company, Northfield, Ill., USA), and a phosphate ester surfactant (STEPFAC™ 8170, Stepan Company, Northfield, Ill., USA) was prepared. The blend was 80% lecithin, 10% DEHA, 7% fatty acid ethoxylate surfactant, and 3% phosphate ester surfactant by weight. The blend was prepared by mixing the lecithin, DEHA, and two surfactants and heating the mixture to 50° C. under constant stirring for 30 to 60 minutes. The blend was cooled to ambient temperature (approximately 25° C.). The blend was a free-flowing liquid at ambient temperature. The blend was water dispersible.

Example 10

A blend of crude filtered lecithin (YELKIN® T, Archer Daniels Midland Company, Decatur, Ill., USA), unsaturated propylene glycol monoester (PGME, Archer Daniels Midland Company, Decatur, Ill., USA), and a tall fatty acid ethoxylate surfactant (NINEX® MT-610, Stepan Company, Northfield, Ill., USA) was prepared. The blend was 80% lecithin, 10% PGME, and 10% surfactant by weight. The blend was prepared by mixing the lecithin, PGME, and surfactant and heating the mixture to 50° C. under constant stirring for 30 to 60 minutes. The blend was cooled to ambient temperature (approximately 25° C.). The blend was a free-flowing liquid at ambient temperature. The blend was water dispersible.

Example 11

A blend of crude filtered lecithin (YELKIN® T, Archer Daniels Midland Company, Decatur, Ill., USA), unsaturated propylene glycol monoester (PGME, Archer Daniels Midland Company, Decatur, Ill., USA), a tall fatty acid ethoxylate surfactant (NINEX® MT-610, Stepan Company, Northfield, Ill., USA), and a phosphate ester surfactant (STEPFAC™ 8170, Stepan Company, Northfield, Ill., USA) was prepared. The blend was 80% lecithin, 10% PGME, 7% fatty acid ethoxylate surfactant, and 3% phosphate ester surfactant by weight. The blend was prepared by mixing the lecithin, PGME, and two surfactants and heating the mixture to 50° C. under constant stirring for 30 to 60 minutes. The blend was cooled to ambient temperature (approximately 25° C.). The blend was a free-flowing liquid at ambient temperature. The blend was water dispersible.

Example 12

Modified aqueous-based eggshell white paint formulations were prepared incorporating water-dispersible lecithin-DEHA blends as substitutes for conventional dispersants and conventional dispersant blends. The conventional dispersants and blends were used as standards for purposes of comparison. The modified paint formulations were prepared by substituting lecithin-DEHA blends prepared according to Examples 3 and 9 for a conventional dispersant (E-SPERSE 100™ and E-SPERSE 506™ in a 1:1 weigh ratio, Ethox Chemicals, Greenville, S.C., USA) in the standard paint formulation presented in Table 1.

TABLE 1

| Raw Materials | E-SPERSE 100/E-SPERSE 506 (dispersant) | E-SPERSE 100 (dispersant) | Example 3 | Example 9 | Suppliers |
|---|---|---|---|---|---|
| Water | 150.00 | 150.00 | 150.00 | 150.00 | — |
| E-SPERSE 100 (dispersant) | 6.00 | 12.0 | — | — | Ethox Chemicals, LLC |
| E-SPERSE 506 (dispersant) | 6.00 | — | — | — | Ethox Chemicals, LLC |
| Example 3 | — | — | 12.0 | — | ADM |
| Example 9 | — | — | — | 12.0 | ADM |
| AMP-95 (neutralizer) | 3.50 | 3.50 | 3.50 | 3.50 | Angus Chemical Company |
| DEFOAMER 31 (defoamer) | 11.00 | 11.00 | 11.00 | 11.00 | Ethox Chemicals, LLC |
| BURGESS 98 (hydrous aluminum silicate) | 60.00 | 60.00 | 60.00 | 60.00 | Burgess Pigment Company |
| Titanium Dioxide | 260.00 | 260.00 | 260.00 | 260.00 | DuPont |
| Calcium Carbonate | 60.00 | 60.00 | 60.00 | 60.00 | Omya |
| ATTAGEL 50 (rheology modifer) | 4.50 | 4.50 | 4.50 | 4.50 | BASF |
| Water | 50.00 | 50.00 | 50.00 | 50.00 | — |
| RHOPLEX AC-364 (acrylic emulsion paint binder) | 400.00 | 400.00 | 400.00 | 400.00 | Rohm and Haas Company |
| TEXANOL (ester alcohol) | 6.50 | 6.50 | 6.50 | 6.50 | Eastman Chemical Company |
| ACRYSOL RM 2020NPR (rheology modifier) | 25.00 | 25.00 | 25.00 | 25.00 | Rohm and Haas Company |
| ACRYSOL SCT-275 (rheology modifier) | 5.00 | 5.00 | 5.00 | 5.00 | Rohm and Haas Company |
| Water | 40.00 | 40.00 | 40.00 | 40.00 | — |
| DEFOAMER 31 (defoamer) | 5.60 | 5.60 | 5.60 | 5.60 | Ethox Chemicals, LLC |
| Water | 37.86 | 37.86 | 37.86 | 37.86 | — |
| Total lbs/100 gallons paint | 1130.96 | 1130.96 | 1130.96 | 1130.96 | — |

Dispersion was performed with a STIR-PAK™ mixing system (Thermo Fisher Scientific, Inc., Waltham, Mass., USA) at dial setting 2.5 for 30 minutes for all formulations except the formulation comprising the lecithin-DEHA blend from Example 9, which was dispersed at dial setting 2 due to an observed low mill base viscosity. Various properties were measured for the standard paint formulation, a formulation comprising E-SPERSE 100™ (dispersant) alone, and for the modified formulations comprising the lecithin-DEHA blend from Example 3 or the lecithin-DEHA blend from Example 9 substituted for the conventional E-SPERSE™ (dispersant) mixture.

The viscosities of the paint formulations were measured approximately 24 hours after dispersion. Paint samples were applied on a plain white LENETA paper using a BIRD applicator at 6 mils and paint film properties were measured after the films were dried overnight under ambient conditions. Heat-aged stability tests were conducted for the formulations for 7 days at 140° C. Two commercial colorants (COLORTREND® Phthalocyanine Blue and Red Iron Oxide, Evonik Industries (Degussa)) were also used to evaluate color acceptance/compatibility for the modified paint formulations. The modified eggshell white paint formulations were mixed with colorant at a weight ratio of 99:1

(paint:colorant). Color properties (CIE L*a*b* system) were determined using a BYK Color-guide 45/0 color measurement instrument (BYK-Gardner USA, Columbia, Md., USA). The results are presented in Table 2 and FIGS. 3-5.

ganic), Evonik Industries (Degussa)). A lower absolute value for the organic blue colorant represents better color acceptance/compatibility between the organic colorant and the dispersant, and a higher absolute value for the inorganic red

TABLE 2

| Paint Properties | Standard E-SPERSE 100:E-SPERSE 506 (dispersant) | E-SPERSE 100 (dispersant) | Example 3 | Example 9 |
|---|---|---|---|---|
| Dispersion Time | 30 mins | 30 mins | 30 mins | 30 mins |
| STIR-PAK Speed No. | 2.5 | 2.5 | 2.5 | 2.0 |
| Mill Base Viscosity (Krebs) | 98 | 91.2 | 123 | 85 |
| Final Viscosity (Krebs) | 80.3 | 72.4 | 82.5 | 73.6 |
| Paint Condition (1 = best) | Microfoam (1) | Microfoam (2) | Foam (4) | Foam (3) |
| Gloss @ 60 deg angle | 34.7 | 28.9 | 34.7 | 30 |
| Opacity | 97.36 | 97.2 | 97.1 | 97.22 |
| Whiteness CIELab L* = 100 | 96.24 | 96.2 | 96.22 | 96.16 |
| Yellowness YE 313-73 | 3.35 | 3.43 | 4.26 | 4.25 |
| Scrub Resistance @ 250 cycles | Comparable with Standard (E-SPERSE 100/E-SPERSE 506 Blend) | | | |
| Heat-aged Stability | | | | |
| Viscosity (Krebs Unit) | 111.1 | 104.2 | 102.5 | 89.6 |
| Gloss @ 60 deg angle | 34.6 | 29.1 | 32.6 | 29.40 |
| Yellowness (YE 313-73) | 3.21 | 3.35 | 3.85 | 3.83 |
| In-can condition after Heat-aged stability | Sort of a soft putty like before mixing then stabilized after hand-mixing | With very slight foam formation after hand-mixing | With slight tinge of yellowness on top and foam formation after hand-mixing | With slight tinge of yellowness on top and very smooth after hand-mixing. Best in-can condition |
| Color strength/compatibility | | | | |
| Red Oxide | | | | |
| Rub-up | good | good | good | good |
| Redness (+a* value) | 18.23 | 18.47 | 18.28 | 18.38 |
| Lightness (L* value) | 76.02 | 75.67 | 75.96 | 75.84 |
| Phthalo Blue | | | | |
| Rub-up | good | good | good | good |
| Blueness (-b* value) | -18.96 | -19.10 | -18.97 | -18.87 |
| Lightness (L* value) | 81.48 | 81.26 | 81.15 | 81.24 |

Figure 3:
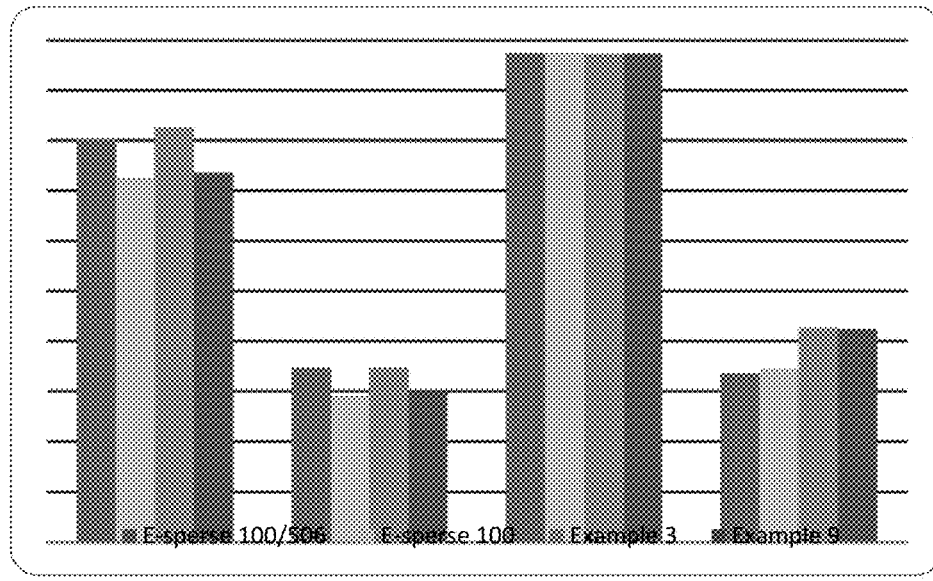
FIG. 3 is a graph comparing various properties for two conventional paint formulations and two paint formulations according to embodiments disclosed herein.

Referring to FIG. 3, the viscosity, gloss and opacity of the paint formulation comprising the lecithin-DEHA blend from Example 3 closely matched the viscosity and gloss of the standard formulation comprising the conventional E-SPERSE™ (dispersant) mixture. The viscosity, gloss and opacity of the paint formulation comprising the lecithin-DEHA blend from Example 9 closely matched the viscosity and gloss of the formulation comprising E-SPERSE 100™ (dispersant) alone. Formulations comprising lecithin-DEHA blends tended to show more yellowing due to the inherent yellowish color of the lecithin-DEHA blends.

Figure 4:
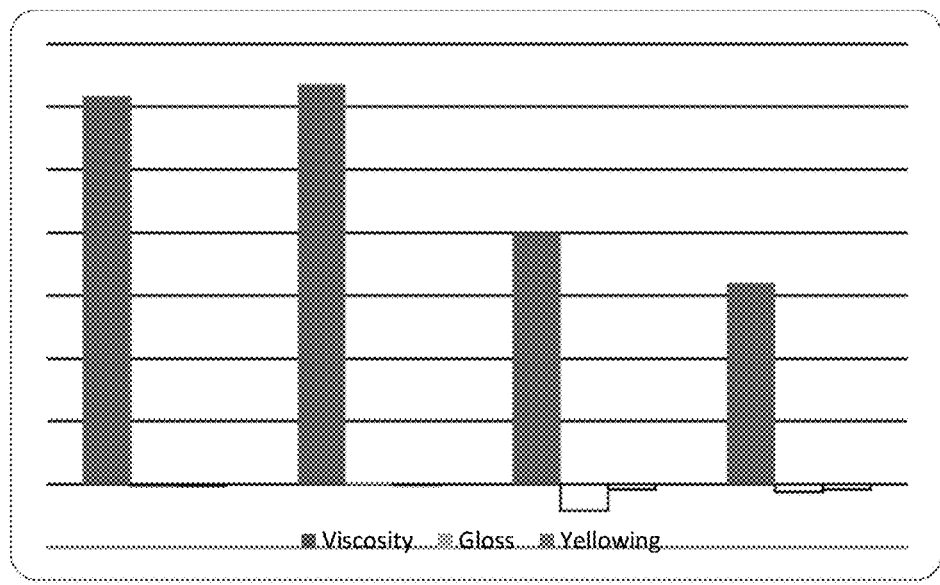
FIG. 4 is a graph comparing changes in various properties after heat-aged stability for two conventional paint formulations and two paint formulations according to embodiments disclosed herein.

Referring to FIG. 4, after exposing the formulations to 140° C. for 7 days, the conventional E-SPERSE™ (dispersant) paint formulations exhibited larger viscosity increases and smaller gloss change than the modified formulations comprising the lecithin-DEHA blends. After heat-aged stability at 140° C. for 7 days, paint formulations comprising the lecithin-DEHA blends exhibited lower viscosity increase and slightly decrease in gloss than the conventional E-SPERSE™ (dispersant) paint formulations. Paint formulations comprising the lecithin-DEHA blends showed more paint yellowing due to the inherent yellowish color of the lecithin-DEHA blends.

Figure 5:
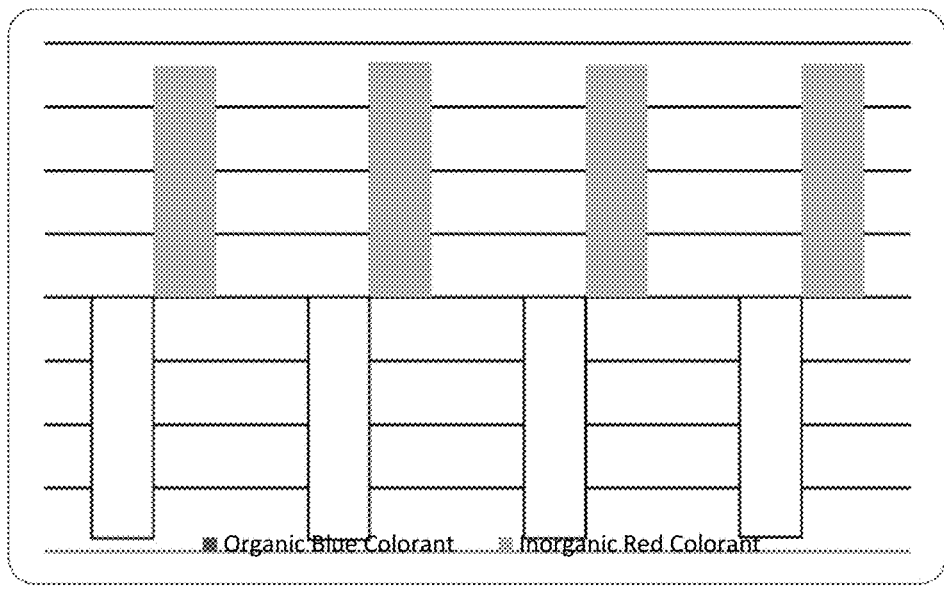
FIG. 5 is a graph comparing color strength results for two conventional paint formulations comprising an organic pigment, two conventional paint formulations comprising an inorganic pigment, two paint formulations according to embodiments disclosed herein comprising an organic pigment, and two paint formulations according to embodiments disclosed herein comprising an inorganic pigment.

FIG. 5 illustrates the color strengths of the paint formulations with two commercial colorants (COLORTREND® Phthalocyanine Blue (organic) and Red Iron Oxide (inorcolorant represents better color acceptance/compatibility between the inorganic colorant and the dispersant. The conventional E-SPERSE™ (dispersant) mixture and the lecithin-DEHA blends exhibited better color compatibility with the organic and inorganic colorants than the E-SPERSE 100™ dispersant alone. The lecithin-DEHA blend from Example 9 exhibited better compatibility with the organic colorant than the other dispersants. The conventional E-SPERSE™ (dispersant) mixture and the lecithin-DEHA bend from Example 3 exhibited better compatibility with the inorganic colorant than the other dispersants.

Overall, the performance of the lecithin-DEHA blends as dispersants in water-based paint formulations was comparable to standard commercial dispersants.

Example 13

Modified aqueous-based interior semigloss white paint formulations were prepared incorporating water-dispersible lecithin-DEHA blends as substitutes for a conventional dispersant. A conventional hydrophobic copolymer polyelectrolyte dispersant (TAMOL™ 165A, Rohm and Haas Company, Philadelphia, Pa., USA) was substituted with each of two lecithin-DEHA blends (Example 3 and Example 9) on a weight-for-weight basis in the standard paint formulation presented in Table 3. The conventional dispersant was used as a standard for purposes of comparison with the modified formulations.

TABLE 3

| Raw materials | Tamol 165 A (dispersant) | Example 3 | Example 9 | Commercial Supplier |
|---|---|---|---|---|
| Water | 100.00 | 100.00 | 100.00 | — |
| Tamol 165A (dispersant) | 6.00 | — | — | Rohm and Haas Company |
| Example 3 | — | 6.00 | — | ADM |
| Example 9 | — | — | 6.00 | ADM |
| BYK 348 (surfactant) | 2.00 | 2.00 | 2.00 | Byk-Chemie GmbH |
| FOAMSTAR A-34 (defoamer) | 1.00 | 1.00 | 1.00 | Fitz Chem Corporation |
| MINEX 10 (filler) | 7.50 | 7.50 | 7.50 | Unimin Specialty Minerals, Inc |
| Titanium Dioxide | 257.00 | 257.00 | 257.00 | DuPont |
| KATHON LX 1.5% (microbicide) | 1.80 | 1.80 | 1.80 | Rohm and Haas Company |
| RHOPLEX VSR 1050 (acrylic emulsion) | 454.20 | 454.20 | 454.20 | Rohm and Haas Company |
| ROPAQUE ULTRA Emulsion (polymer) | 23.50 | 23.50 | 23.50 | Rohm and Haas Company |
| Propylene Glycol | 9.00 | 9.00 | 9.00 | Sigma Aldrich |
| ARCHER RC (reactive coalescent) | 2.25 | 2.25 | 2.25 | Archer Daniels Midland Company |
| FOAMSTAR A-34 (defoamer) | 1.00 | 1.00 | 1.00 | Fitz Chem Corporation |
| Ammonia Water, 28% | 0.80 | 0.80 | 0.80 | Sigma Aldrich |
| ACRYSOL RM 2020NPR (rheology modifier) | 33.00 | 33.00 | 33.00 | Rohm and Haas Company |
| ACRYSOL SCT-275 (rheology modifier) | 5.00 | 5.00 | 5.00 | Rohm and Haas Company |
| Water | 147.40 | 147.40 | 147.40 | — |
| Water | 4.18 | 4.18 | 4.18 | — |
| Total lbs/ 100 gallon paint | 1055.63 | 1055.63 | 1055.63 | — |

Dispersion was performed with a STIR-PAK™ mixing system (Thermo Fisher Scientific, Inc., Waltham, Mass., USA) at dial setting 2.25 for 15 minutes for all formulations. Various properties were measured for the standard paint formulation and for the modified paint formulations comprising the lecithin-DEHA blend from Example 3 or the lecithin-DEHA blend from Example 9 substituted for the conventional TAMOL™ 165A (dispersant).

The viscosities of the paint formulations were measured approximately 24 hours after dispersion. Paint samples were applied on a plain white LENETA paper using a BIRD applicator at 6 mils and paint film properties were measured after the films were dried overnight under ambient conditions. Heat-aged stability tests were conducted for the formulations for 7 days at 140° C. Two commercial colorants (COLORTREND® Phthalocyanine Blue and Red Iron Oxide, Evonik Industries (Degussa)) were also used to evaluate color acceptance/compatibility for the modified paint formulations. The modified high quality extended white paint formulations were mixed with colorant at a weight ratio of 99:1 (formulation:colorant). CIE L*a*b* color measurements were taken with a BYK Color-guide 45/0 color measurement instrument (BYK-Gardner USA, Columbia, Md., USA). The results are presented in Table 4 and FIGS. 6-8.

TABLE 4

| Paint Properties | Standard TAMOL 165A (dispersant) | Example 3 | Example 9 |
|---|---|---|---|
| Dispersion Time | 15 min | 15 min | 15 min |
| STIR-PAK (mixing system) Speed | 2.25 | 2.25 | 2.25 |
| Final Viscosity (Krebs) | 99.6 | 85.7 | 87.6 |
| Paint Condition (1 = best) | No foam (1) | Very slight foam (2) | No foam (1) |
| Wet application | bubbly | better than TAMOL 165 A (dispersant) | better than TAMOL 165A (dispersant) and Example 3 |
| Gloss @ 60 deg angle | 62.1 | 60 | 61.7 |
| Opacity | 98 | 97.6 | 97.5 |
| Whiteness CIELab L* = 100 | 96.81 | 96.66 | 96.6 |
| Yellowness YE 313-73 | 2.29 | 2.74 | 2.72 |
| Scrub Resistance @ 495 cycles (1 = best) | 1 | 3 | Better than Example 3 |
| Heat-aged Stability | | | |
| Viscosity (Krebs unit) | 105.9 | 92.7 | 95.0 |
| Gloss @ 60 deg angle | 61.10 | 60.3 | 62.5 |
| Yellowness (YE) | 2.69 | 2.92 | 2.95 |
| In-can condition after Heat-aged stability | Slight yellowness on top. Smooth after hand-mixing | Slightly pinkish on top. Smooth after hand-mixing | Slightly pinkish on top. Smooth after hand-mixing |
| Color Strength/ Compatibility Red Iron Oxide | | | |
| Rub-up | good | good | good |
| Redness (+a* value) | 17.69 | 17.70 | 17.74 |
| Lightness (L* value) | 76.93 | 76.93 | 76.86 |
| Phthalo Blue | | | |
| Rub-up | good | good | good |
| Blueness (−b* value) | −19.56 | −19.26 | −19.05 |
| Lightness (L* value) | 81.85 | 81.81 | 81.89 |

The formulation comprising the lecithin-DEHA blend from Example 3 had a lower mill base viscosity than the standard formulation comprising TAMOL™ 165A (dispersant), and the formulation comprising the lecithin-DEHA blend from Example 9 had a higher mill base viscosity than the standard formulation comprising TAMOL™ 165A (dispersant).

Figure 6:
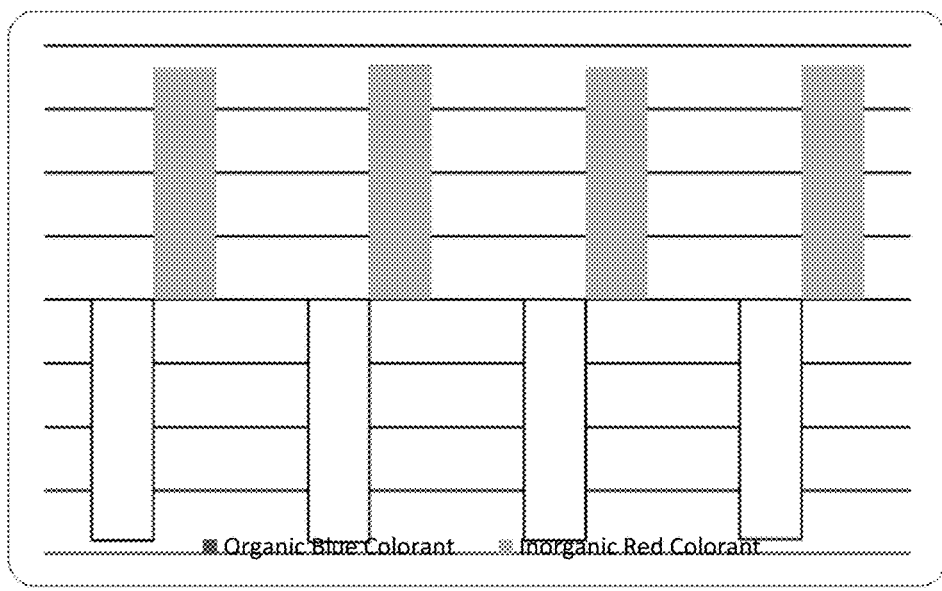
FIG. 6 is a graph comparing various properties for a conventional paint formulation and two paint formulations according to embodiments disclosed herein.

Referring to FIG. 6, the viscosity of the paint formulations comprising lecithin-DEHA blends was lower than the viscosity of the standard paint formulation comprising TAMOL™ 165A (dispersant). The paint formulation comprising the lecithin-DEHA blend from Example 9 exhibited higher viscosity and gloss than the paint formulation comprising the lecithin-DEHA blend from Example 3. Paint formulations comprising lecithin-DEHA blends exhibited more yellowing due to the inherent yellowish color of the lecithin-DEHA blends. Opacity was comparable across all paint formulations.

Figure 7:
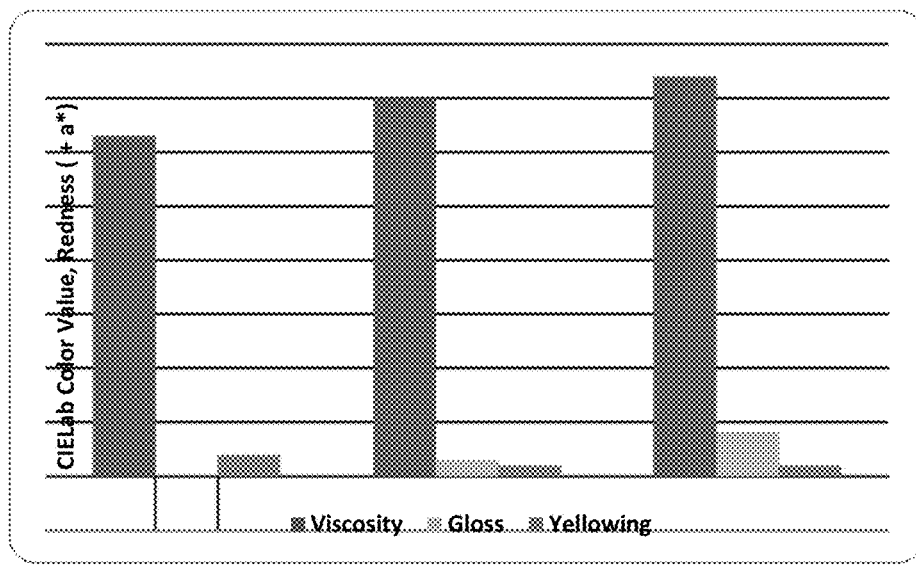
FIG. 7 is a graph comparing changes in properties after heat-aged stability for a conventional paint formulation and two paint formulations according to embodiments disclosed herein.

Referring to FIG. 7, after heat-aged stability at 140° C. for 7 days, paint formulations comprising the lecithin-DEHA blends exhibited slightly higher viscosity increase and better gloss stability and less paint yellowing than the standard paint formulation comprising TAMOL™ 165A (dispersant).

Figure 8:
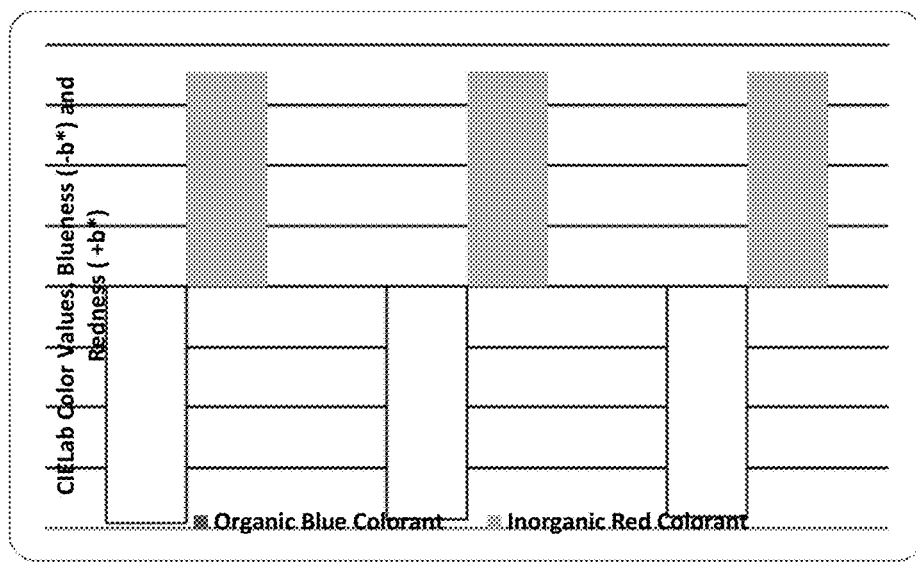
FIG. 8 is a graph comparing color compatibility results for a conventional paint formulation comprising an organic blue pigment, a conventional paint formulation comprising an inorganic red pigment, two paint formulations according to embodiments disclosed herein comprising an organic blue pigment, and two paint formulations according to embodiments disclosed herein comprising an inorganic red pigment.

FIG. 8 illustrates the color strength/compatibility of the paint formulations with the colorants COLORTREND® Phthalocyanine Blue (organic) and Red Iron Oxide (inorganic) (Evonik Industries (Degussa)). A lower absolute value for the organic blue colorant represents better color acceptance/compatibility between the organic colorant and the dispersant, and a higher absolute value for the inorganic colorant represents better color acceptance/compatibility between the inorganic colorant and the dispersant. The paint formulations comprising lecithin-DEHA blends exhibited better color compatibility with the organic colorant than the paint formulations comprising TAMOL™ 165A (dispersant). The paint formulation comprising TAMOL™ 165A (dispersant) equal color compatibility with paint formulation comprising the lecithin-DEHA blend from Example 3 and better than lecithin-DEHA blend from Example 9. The paint formulation comprising the lecithin-DEHA blend from Example 9 exhibited better color compatibility with the organic colorant than the paint formulation comprising the lecithin-DEHA blend from Example 3. The paint formulation comprising the lecithin-DEHA blend from Example 3 exhibited better color compatibility with the inorganic colorant than the paint formulation comprising the lecithin-DEHA blend from Example 9.

Overall, the performance of the lecithin-DEHA blends as dispersants in water-based paint formulations was comparable to conventional TAMOL™ 165A commercial dispersant.

Example 14

Modified aqueous-based red iron oxide pigment dispersion formulations were prepared incorporating water-dispersible lecithin-DEHA blends as substitutes for a commercially available dispersant. The commercially available dispersant (R&R 551®, Archer Daniels Midland Company, Decatur, Ill., USA) was substituted with each of two lecithin-DEHA blends (Example 3 and Example 9) on a weight-for-weight basis in the dispersion formulation presented in Table 5 to form the modified formulations. The commercially available dispersant was used as a standard for purposes of comparison with the modified dispersant formulations.

TABLE 5

| Raw materials | Standard R&R 551 (dispersant) | Example 3 | Example 9 | Commercial Supplier |
|---|---|---|---|---|
| Ethylene Glycol | 268.17 | 268.17 | 268.17 | Sigma Aldrich |
| Water | 191.60 | 191.60 | 191.60 | — |
| M-Pyrol | 8.15 | 8.15 | 8.15 | International Specialty Products |
| IGEPAL CO-630 (surfactant) | 88.56 | 88.56 | 88.56 | Rhodia |
| R&R 551 (dispersant) | 58.16 | — | — | ADM |
| Example 3 | — | 58.16 | — | ADM |
| Example 9 | — | — | 58.16 | ADM |
| PEGOSPERSE 200ML (surfactant) | 25.68 | 25.68 | 25.68 | Lonza, Inc. |
| KATHON LX 1.5% (microbicide) | 2.24 | 2.24 | 2.24 | Rohm and Haas Company |

TABLE 5-continued

| Raw materials | Standard R&R 551 (dispersant) | Example 3 | Example 9 | Commercial Supplier |
|---|---|---|---|---|
| ASP 200 (hydrous pulverized and spray dried kaolin) | 225.72 | 225.72 | 225.72 | BASF |
| Red Iron Oxide R3098D | 589.14 | 589.14 | 589.14 | Evonik Industries |
| Total lbs/ 100 gallons paint | 1457.42 | 1457.42 | 1457.42 | |

Dispersion was performed with a STIR-PAK™ mixing system (Thermo Fisher Scientific, Inc., Waltham, Mass., USA) at dial setting 3 for 45 minutes for all formulations. Various properties were measured for the standard formulation comprising R&R 551® (dispersant) and for the modified formulations the lecithin-DEHA blend from Example 3 or the lecithin-DEHA blend from Example 9 substituted for the R&R 551® (dispersant). The results are presented in Table 6 and FIGS. 9-10.

TABLE 6

| Dispersion Properties | Standard R&R 551 (dispersant) | Example 3 | Example 9 |
|---|---|---|---|
| Dispersion Time | 45 mins | 45 mins | 45 mins |
| STIR-PAK (mixing system) Speed | 3 | 3 | 3 |
| Mill Base without Pigments | slight haziness | hazy | clear |
| Viscosity (Krebs) | 90.4 | 88.7 | 85.0 |
| Weight per Gallon, lbs | 9.01 | 11.32 | 9.25 |
| Color Compatibility | | | |
| Rub-up | Good | Good | Good |
| Lightness (L* value) | 73.66 | 73.88 | 74.01 |
| Redness (+a* value) | 14.54 | 14.55 | 14.17 |

Figure 9:
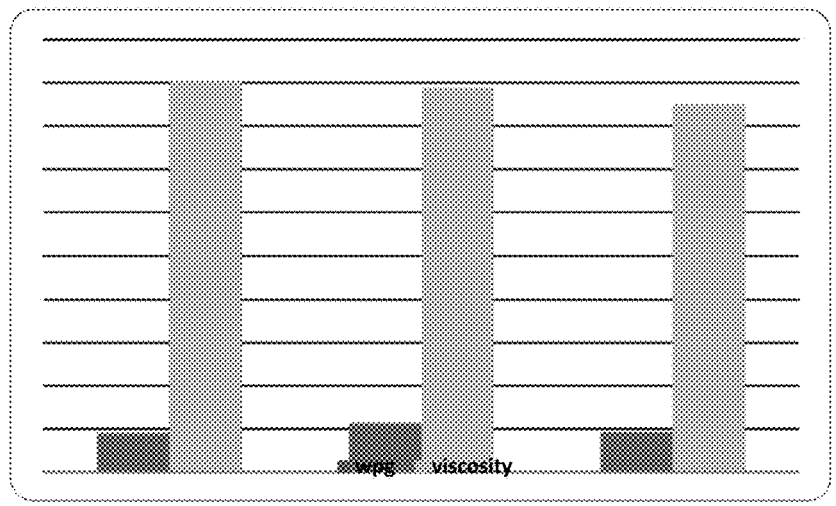
FIG. 9 is a graph comparing weight per gallon and viscosity values for a conventional paint formulation and two paint formulations according to embodiments disclosed herein.

The formulations comprising R&R 551® (dispersant) and the lecithin-DEHA blend from Example 9 produced foam during the dispersion process as indicated by its low weight per gallon ("WPG") measurements presented in FIG. 9. The formulation comprising the lecithin-DEHA blend from Example 3 did not produce any foam during the dispersion process as indicated by its high WPG measurements presented in FIG. 16.

Figure 10:
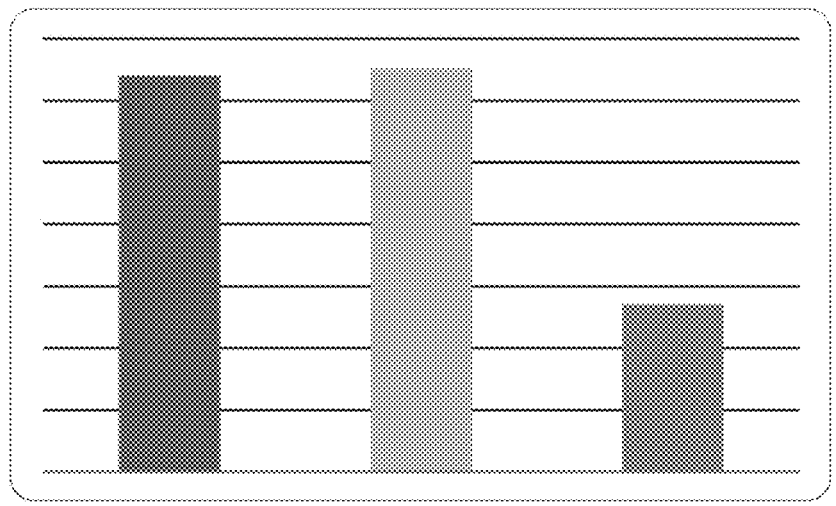
FIG. 10 is a graph showing color compatibility results for a conventional paint formulation and two paint formulations according to embodiments disclosed herein.

FIG. 10, illustrates the color compatibility of the red iron oxide pigment dispersion formulations with commercial interior semigloss midtone base paint. A higher absolute value represents better color compatibility between the colorant and the dispersant. The lecithin-DEHA blend from Example 3 exhibited comparable color compatibility with the standard R&R 551® dispersant in the formulations. The color compatibility of the lecithin-DEHA blend from Example 9 was lower than the color compatibility of R&R 551® (dispersant) and the lecithin-DEHA blend from Example 3.

Example 15

The dispersibility of carbon black pigment (REGAL® 660R, Cabot Corporation, Billerica, Mass., USA) in formulations comprising the lecithin-DEHA blend from Example 9 was compared to the dispersibility of carbon black in formulations comprising E-SPERSE 100™ as a standard dispersant. Dispersion was performed with a STIR-PAK™ mixing system (Thermo Fisher Scientific, Inc., Waltham, Mass., USA) at dial setting 2.5 for 30 minutes for all formulations of the mill base. Glass beads were added to the mill base dispersion at 75% by weight of the mill base to attain dispersion with an acceptable fineness of grind. The dispersion formulations are presented in Table 7 (all values are mass units unless otherwise indicated).

TABLE 7

| Formulation Component | E-SPERSE 100 (dispersant) Formulation | Example 9 Formulation 1 | Example 9 Formulation 2 | Supplier |
|---|---|---|---|---|
| Water | 31.20 | 44.0 | 43.96 | — |
| E-SPERSE 100 (dispersant) | 5.2 | — | — | Ethox Chemicals |
| Example 9 | — | 7.35 | 11.0 | Experimental |
| TRITON X-100 (surfactant) | — | — | 5.86 | Dow Chemical |
| AMP-95 (neutralizer) | — | 0.72 | 0.73 | Angus Chemical |
| DEFOAMER 31 (defoamer) | 1.15 | 1.62 | — | Ethox Chemicals |
| REGAL 660R (pigment) | 29.57 | 26.63 | 21.98 | Cabot |
| DREWPLUS L-475 (antifoam) | — | — | 1.83 | Ashland |
| Water | 32.88 | 19.68 | 14.65 | — |
| Total % | 100.00 | 100.00 | 100.00 | — |

The formulations comprising the lecithin-DEHA blend from Example 9 exhibited good mill base viscosity and fineness of grind. An octylphenol ethylene oxide condensate surfactant (TRITON™ X-100, Dow Chemical Company, Midland, Mich., USA) was added to the formulation comprising the lecithin-DEHA blend from Example 9 (Formulation 2 in Table 8). The formulation comprising the lecithin-DEHA blend from Example 9 and octylphenol ethylene oxide condensate surfactant ("TRITON™ X-100") exhibited improved mill base viscosity and improved pigment loading.

The pigment dispersion formulations were blended with commercial white base paints to evaluate the color compatibility of the pigment dispersions. The pigment dispersions and white base paint were mixed in a STIR-PAK™ mixing system (Thermo Fisher Scientific, Inc., Waltham, Mass., USA) at dial setting 2.5 for 15 minutes to produce a 0.60% pigmented paint. Draw down paint samples were applied on a plain white LENETA paper using a BIRD applicator at 6 mils. Rub-up test samples were prepared by rubbing the applied paint in a circular motion for about 30-45 seconds at 3 and 5 minutes after initial application. CIE L*a*b* color measurements were taken with a BYK Color-guide 45/0 color measurement instrument (BYK-Gardner USA, Columbia, Md., USA) after the films were dried overnight under ambient conditions. The results are presented in FIGS. 11-12.

Figure 11:
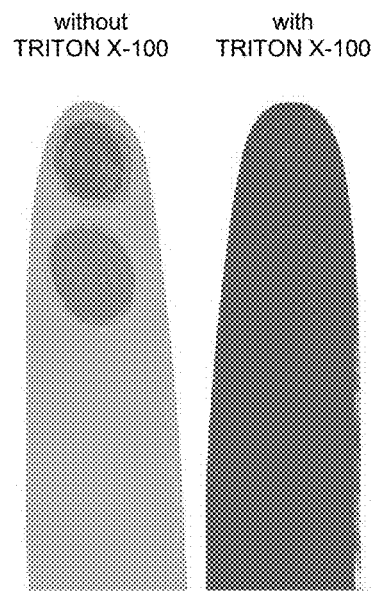
FIG. 11 is a photograph of rub-up test panels comparing two paints comprising carbon black dispersions according to embodiments disclosed herein mixed with white base paints.
Figure 12:
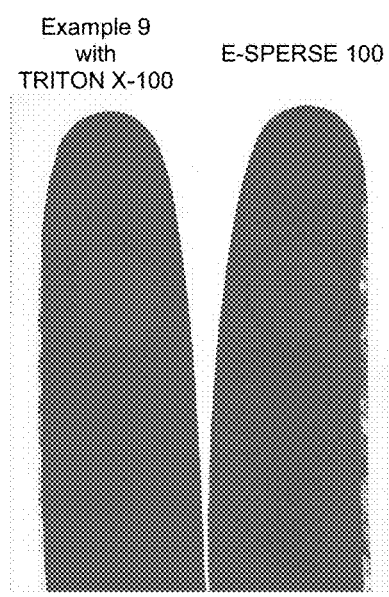
FIG. 12 is a photograph of rub-up test panels comparing a paint comprising a conventional carbon black pigment dispersion formulation mixed with a white base paint and a paint comprising a carbon black dispersion according to embodiments disclosed herein mixed with a white base paint.

As presented in FIGS. 11-12, the dispersant formulation comprising the lecithin-DEHA blend from Example 9 and TRITON™ X-100 surfactant exhibited improved color compatibility compared to the formulation comprising the lecithin-DEHA blend from Example 9 without the surfactant. FIG. 12 illustrates that the dispersant formulation comprising the lecithin-DEHA blend from Example 9 and TRITON™ X-100 (surfactant) and the E-SPERSE 100™ dispersant formulation exhibited comparable color compatibility.

Example 16

The dispersibility of red iron oxide pigment (COPPERAS™ R4098, Elementis/Rockwood, Fairview Heights, Ill., USA) in formulations comprising the lecithin-DEHA blend from Example 3 and the lecithin-DEHA blend from Example 9 were compared to the dispersibility of red iron oxide pigment in formulations comprising E-SPERSE 100™ (dispersant) as a standard. Dispersion was performed with a STIR-PAK™ mixing system (Thermo Fisher Scientific, Inc., Waltham, Mass., USA) at dial setting 2.5 for 30 minutes for all formulations of the mill base. Glass beads were added to the mill base dispersion at 75% by weight of the mill base to attain dispersion with an acceptable fineness of grind. The dispersion formulations are presented in Table 8 (all values are weight units unless otherwise indicated).

TABLE 8

| Raw Materials | E-SPERSE 100 (dispersant) | Example 3 | Example 9 | Supplier |
|---|---|---|---|---|
| Water | 27.92 | 27.44 | 33.23 | — |
| E-Sperse 100 (dispersant) | 4.67 | — | — | Ethox Chemicals |
| Example 3 | — | 4.58 | — | ADM |
| Example 9 | — | — | 5.55 | ADM |
| DEFOAMER 31 (defoamer) | 1.03 | 1.01 | 1.22 | Ethox Chemicals |
| COPPERAS R4098 (pigment) | 37.00 | 66.97 | 60.0 | Elementis/Rockwood |
| Water | 29.38 | — | — | — |
| Total | 100.0 | 100.0 | 100.0 | |
| wt % Pigment | 37.00 | 66.97 | 60.00 | |
| % Dispersant on Pigment | 12.62 | 6.84 | 9.25 | |

The pigment dispersion formulations were blended with commercial white base paints to evaluate the color compatibility of the pigment dispersions. The pigment dispersions and white base paint were mixed in a STIR-PAK™ mixing system (Thermo Fisher Scientific, Inc., Waltham, Mass., USA) at dial setting 2.5 for 15 minutes to produce a 2.0% pigmented paint. Paint samples were applied on a plain white LENETA paper using a BIRD applicator at 6 mils. Rub-up test samples were prepared by rubbing the applied paint in a circular motion for about 30-45 seconds at 3 and 5 minutes after initial application. CIE L*a*b* color measurements were taken with a BYK Color-guide 45/0 color measurement instrument (BYK-Gardner USA, Columbia, Md., USA) after the films were dried overnight under ambient conditions. The results are presented in FIGS. 13-14.

Figure 13:
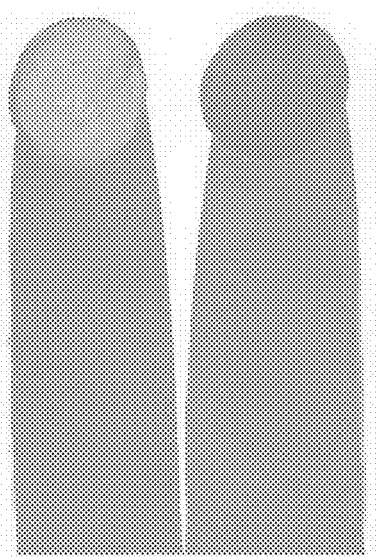
FIG. 13 is a photograph of rub-up test panels comparing paints comprising red iron oxide pigment dispersions in a white base paint; the pigment dispersions used in the paints are a conventional dispersion and a dispersion according to embodiments disclosed herein.
Figure 14:
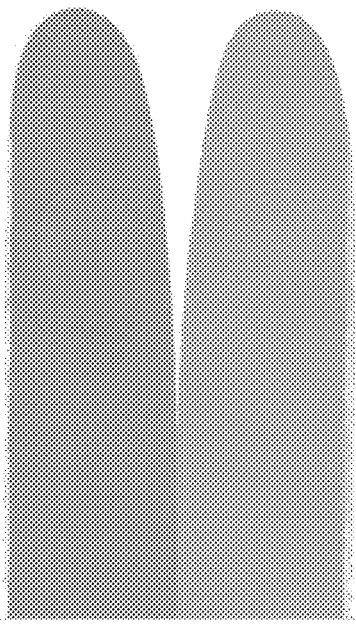
FIG. 14 is a photograph of rub-up test panels comparing paints comprising red iron oxide pigment dispersions in a white base paint; the pigment dispersions used in the paints are a conventional dispersion and a dispersion according to embodiments disclosed herein.

The red iron oxide pigment exhibited good dispersion in all three dispersant formulations. FIG. 13 illustrates that the dispersion formulations comprising E-SPERSE 100™ (dispersant) and the dispersion formulations comprising the lecithin-DEHA blend from Example 9 exhibited poor color compatibility with the base paint. FIG. 14 illustrates that the dispersion formulations comprising the lecithin-DEHA blend from Example 3 exhibited better color compatibility than the dispersion formulations comprising E-SPERSE 100™ (dispersant) with the base paint.

Example 17

The surfactants listed in Table 9 were evaluated in the carbon black pigment formulations presented in Table 10 (all values are mass units unless otherwise indicated). Dispersion was performed with a STIR-PAK™ mixing system (Thermo Fisher Scientific, Inc., Waltham, Mass., USA) at dial setting 2.5 for 30 minutes for all formulations of the mill base. Glass beads were added to the mill base at 75% by weight of the mill base. The fineness of grind of the dispersion was measured using a Hegman Gauge. Color compatibility was evaluated by blending the pigment dispersions with commercial white base paints (PPG Ultra Interior Semigloss Midtone ("midtone base") and PPG Ultra Neutral Base ("neutral base")).

TABLE 9

| Surfactant | Supplier | Description |
|---|---|---|
| TRITON X-100 | DOW | nonyl phenol ethoxylate; non-ionic; HLB ≅ 13.5 |
| NINEX MT 615 | Stepan | fatty acid ethoxylate; anionic; HLB ≅ 13 |
| PLURAFAC B25-5 | BASF | alkoxylated fatty alcohol; non-ionic; HLB ≅ 12 |
| PLURAFAC B26 | BASF | alkoxylated fatty alcohol; non-ionic; HLB ≅ 14 |
| CARBOWET 106 | Air Products | linear ethoxylate; solvent free and alkyl phenol ethoxylate free; non-ionic; HLB ≅ 10.7 |
| TERGITOL L-62 | DOW | polyether polyol; non-ionic; HLB ≅ 7 |
| TERGITOL L-101 | DOW | polyether polyol; non-ionic; HLB ≅ 1 |

TABLE 10

| Ingredients Formulation | Ethox | ADM | Suppliers |
|---|---|---|---|
| water | 31.22 | 43.90 | |
| E-SPERSE 100 (dispersant) | 5.20 | — | Ethox Chemicals |
| Example 9 | — | 10.97 | ADM |
| surfactant * | — | 8.85 | Refer to table 10 |
| DEFOAMER 31 (defoamer) | 1.14 | — | Ethox Chemicals |
| AMP-95 (neutralizer) | — | 0.73 | Angus |
| carbon black pigment | 29.87 | 21.94 | Cabot |
| DREWPLUS L-475 (defoamer) | — | 1.83 | Ashland |
| water | 5.85 | — | — |
| Water | 26.72 | 14.78 | — |
| Total | 100.00 | 100.00 | — |

* surfactants listed in Table 10.

The pigment dispersions and white base paints were mixed in a STIR-PAK™ mixing system (Thermo Fisher Scientific, Inc., Waltham, Mass., USA) at dial setting 2.5 for 15 minutes to produce a paint having 0.66 g pigment per 100 g base paint. Paint samples were applied on a plain white LENETA paper using a BIRD applicator at 6 mils. Rub-up test samples were prepared by rubbing the applied paint in a circular motion for about 30 seconds at 3, 5 and 8 minutes after initial application. CIE L*a*b* color measurements were taken with a BYK Color-guide 45/0 color measurement instrument (BYK-Gardner USA, Columbia, Md., USA) after the films were dried overnight under ambient conditions. The results are presented in Table 11 and FIG. 15.

TABLE 11

| Dispersant | E-SPERSE 100 | Example 9 | |
|---|---|---|---|
| surfactant | None | TRITON X-100 | TERGITOL L-62 |
| % carbon black pigment | 29.57 | 21.98 | 21.98 |
| % dispersant on pigment | 17.64 | 50 | 50 |
| dispersion time (minutes) | 30 | 30 | 30 |
| dispersion Speed (dial setting) | 2.5 | 2.5 | 2.5 |
| pigment dispersion | smooth | smooth | smooth |
| in-can condition (room temperature) after one month | with slight settling | no settling | no settling |
| fineness of grind (microns) | 15 | 15 | 10 |
| color compatibility: amount of pigment in PPG Ultra Neutral and Midtone Base | 0.66 g carbon black pigment/98 g base | | |
| Opacity (with PPG Ultra Neutral Base) | 100.15 | 100.05 | 100.03 |
| CIE L*a*b* value (L*) (midtone base) | 34.83 | 34.94 | 35.41 |
| CIE L*a*b* value (L*) (neutral base) | 8.08 | 7.85 | 7.65 |

Figure 15:
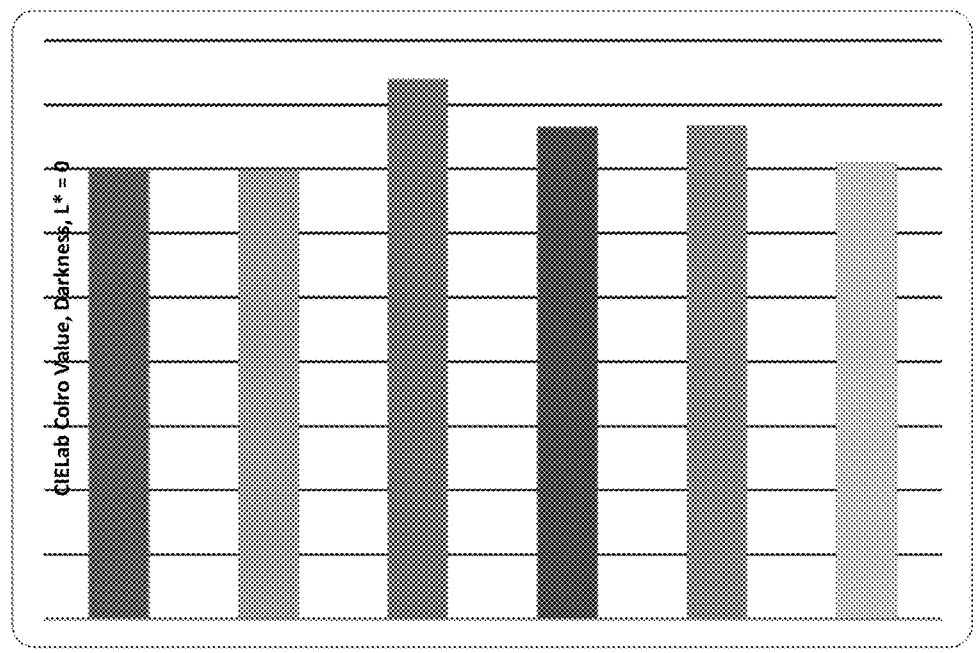
FIG. 15 is a graph comparing CIE L*a*b* lightness values for paints comprising carbon black dispersions and a white base paint; the carbon black pigment dispersions include a conventional pigment dispersion and various pigment dispersions according to embodiments disclosed herein.

The formulation comprising the lecithin-DEHA blend from Example 9 and TERGITOL™ L-62 surfactant (Dow Chemical Company, Midland, Mich., USA) closely matched the performance of the E-SPERSE 100™ (dispersant) standard formulation and the formulation comprising the lecithin-DEHA blend from Example 9 and TRITON™ X-100 (surfactant) in terms of color compatibility as indicated by the CIE L*a*b* lightness values (L*) reported in FIG. 15 for the mixtures of the dispersions and the midtone base (the lower the L* value, the darker the color of the pigmented paint; indicating better dispersion of the carbon black pigment).

The combination of TERGITOL™ L-62 (surfactant) and lecithin-DEHA Blend F exhibited better dispersion than the E-SPERSE 100™ (dispersant) formulation as indicated by the observed fineness of grind, color strength, stability, and opacity (Table 11).

Example 18

Pigment dispersions using Pigment Blue 15:3 (Hostaperm Blue B2G, Clariant, Muttenz, CH) were prepared according to the formulations presented in Table 12 (all values are mass units unless otherwise indicated). The pigment dispersion formulations were blended with commercial white neutral and midtone paint bases to evaluate the color compatibility of the pigment dispersions. The pigment dispersions and white base paints were mixed in a STIR-PAK™ mixing system (Thermo Fisher Scientific, Inc., Waltham, Mass., USA) at dial setting 2.5 for 15 minutes to produce a 3.0 g pigmented paint per 98 g base paint. Paint samples were applied on a plain white LENETA paper using a BIRD applicator at 6 mils. Rub-up test samples were prepared by rubbing the applied paint in a circular motion for about 30-45 seconds at 3 and 5 minutes after initial application. CIE L*a*b* color measurements were taken with a BYK Color-guide 45/0 color measurement instrument (BYK-Gardner USA, Columbia, Md., USA) after the films were dried overnight under ambient conditions. The results are presented in Table 13 and FIG. 16.

TABLE 12

| Ingredients Formulation | E-SPERSE 100/E-SPERSE 506 (dispersant) | ADM | Supplier |
|---|---|---|---|
| water | 54.07 | 35.00 | — |
| E-SPERSE 100 (dispersant) | 2.93 | — | Ethox Chemicals |
| E-SPERSE 506 (dispersant) | 2.00 | — | Ethox Chemicals |
| Example 9 | — | 11 | ADM |
| TERGITOL L-62 (surfactant) | — | 5.8 | Dow Chemicals |
| BYK 022 (defoamer) | 1.00 | 0.75 | Byk Chemie |
| AMP-95 (neutralizer) | — | 0.75 | Angus |
| Hostaperm Blue B2G | 40.00 | 29.00 | Clariant Chemicals |
| water | — | 17.7 | — |
| Total % | 100 | 100 | — |

TABLE 13

| Formulation and Paint Properties | E-SPERSE 100/506 (dispersant) | Example 9 |
|---|---|---|
| surfactants | none | TERGITOL L-62 |
| % Hostaperm Blue B2G Pigment | 39.92 | 28.62 |
| % Dispersant on Pigment | 12.32 | 37.50 |
| dispersion time (minutes) | 45 | 45 |
| dispersion dpeed (dial setting) | 2 | 2.75 |
| pigment dispersion | slightly frothy | smooth |
| fineness of grind (microns) | 0 | 0 |
| color compatibility: amount of pigment in neutral and midtone base | 3.0 g phthalocyanine blue pigment/98 g base | |
| Opacity (neutral base) | 67.85 | 61.32 |
| Opacity (midtone base) | 100.16 | 99.98 |
| CIE L*a*b* value (−b*) (midtone base) | −46.92 | −48.46 |
| CIE L*a*b* value (−b*) (neutral base) | −43.03 | −44.43 |
| CIE L*a*b* value (dE*, rub-up) (midtone base) | 0.98 | 1.27 |

Figure 16:
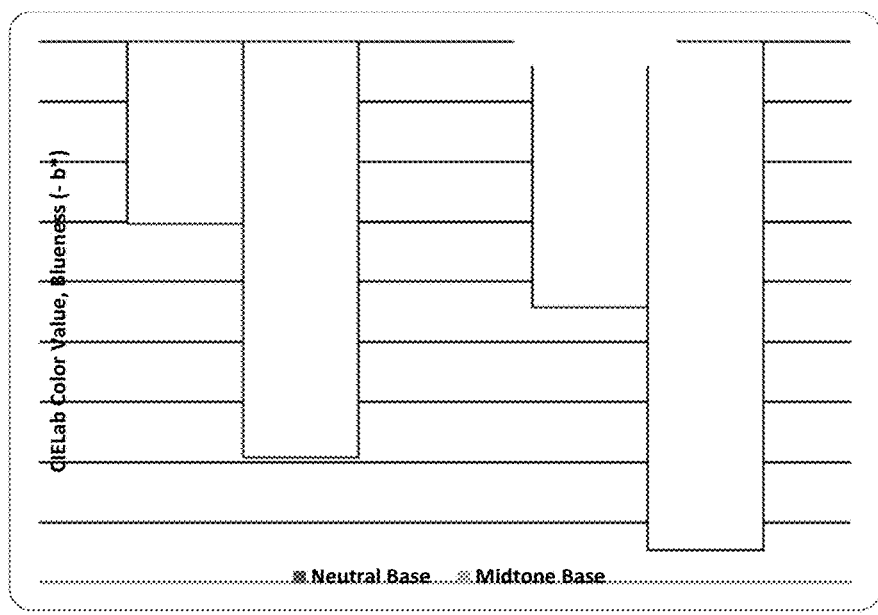
FIG. 16 is a graph comparing CIE L*a*b* blueness values for paints comprising phthalocyanine pigment dispersions in white base paints; the phthalocyanine pigment dispersions include a conventional pigment dispersion and a pigment dispersion according to embodiments disclosed herein.

The low opacity and transparency values as shown in Table 13, and the low CIE L*a*b* blueness value (−b*) as shown in FIG. 16, of the dispersions comprising the lecithin-DEHA blend from Example 9 indicate better pigment dispersion than the E-SPERSE™ (dispersant) formulations.

Example 19

Pigment dispersions using Red Iron Oxide pigment (COPPERAS™ R4098, Rockwood Pigments) were prepared according to the formulations presented in Table 14 (all values are mass units unless otherwise indicated). The pigment dispersion formulations were blended with commercial white neutral and mid-tone base latex paint to evaluate the color compatibility of the pigment dispersions. The pigment dispersions and white base paints were mixed in a STIR-PAK™ mixing system (Thermo Fisher Scientific, Inc., Waltham, Mass., USA) at dial setting 2.5 for 15 minutes to produce a 2.0 g pigmented paint per 98 g base paint. Paint samples were applied on a plain white LENETA paper using a BIRD applicator at 6 mils. Rub-up test samples were prepared by rubbing the applied paint in a circular motion for about 30-45 seconds at 3 and 5 minutes after initial application. CIE L*a*b* color measurements were taken with a BYK Color-guide 45/0 color measurement instrument (BYK-Gardner USA, Columbia, Md., USA) after the films were dried overnight under ambient conditions. The results are presented in Table 15 and FIGS. 17-18.

TABLE 14

| | Trial Formulation using Example 3 and 9 | | | | | |
|---|---|---|---|---|---|---|
| Raw materials | 1 | 2 | 3 | 4 | 5 | Supplier |
| water | 27.45 | 26.50 | 26.50 | 19.20 | 20.00 | — |
| Example 9 | 4.55 | — | 5.25 | 5.25 | 3.75 | ADM |
| Example 3 | — | 5.25 | — | — | — | ADM |
| TERGITOL L-62 (surfactant) | — | 2.80 | 2.80 | 2.8 | 3.00 | Dow Chemical |
| DEFOAMER 31 (defoamer) | 1.00 | — | — | — | — | Ethox Chemicals |
| DREWPLUS L-475 (defoamer) | — | 0.95 | 0.95 | 0.95 | 1.00 | Ashland |
| Red Oxide R4098 | 67.00 | 64.5 | 64.5 | 64.5 | 70 | Rockwood Pigments |
| water | — | — | — | 7.3 | 2.25 | — |
| Total % | 100 | 100 | 100 | 100 | 100 | — |

TABLE 15

Trial Formulation using Example 3 and Example 9

| Dispersants | 1 | 2 | 3 | 4 | 5 |
|---|---|---|---|---|---|
| surfactants | Without surfactant | TERGITOL L-62 | | | |
| % red iron oxide pigment | 66.97 | 64.50 | 64.50 | 64.50 | 70.00 |
| % dispersant on pigment | 6.85 | 8.10 | 8.10 | 8.10 | 5.36 |
| dispersion time (minutes) | 30 | 60 | 60 | 45 | 45 |
| dispersion speed (dial setting) | 2.5 | 2.5 | 2.5 | 2.5 | 2.5 |
| pigment dispersion | smooth | smooth | smooth | smooth | smooth |
| fineness of grind (microns) | 15 | 10 | 10 | 10 | 0 |
| color compatibility: amount of pigment in neutral and midtone base | 2.0 g red iron oxide pigment/98 g base | | | | |
| Opacity (neutral base) | 95.38 | 92.01 | 92.68 | 90.53 | 90.80 |
| CIE L*a*b* value (+b*) (midtone base) | 23.36 | 22.98 | 23.04 | 23.07 | 23.01 |
| CIE L*a*b* value (+b*) (neutral base) | 36.61 | 36.65 | 36.65 | 37.23 | 36.52 |

Figure 17:
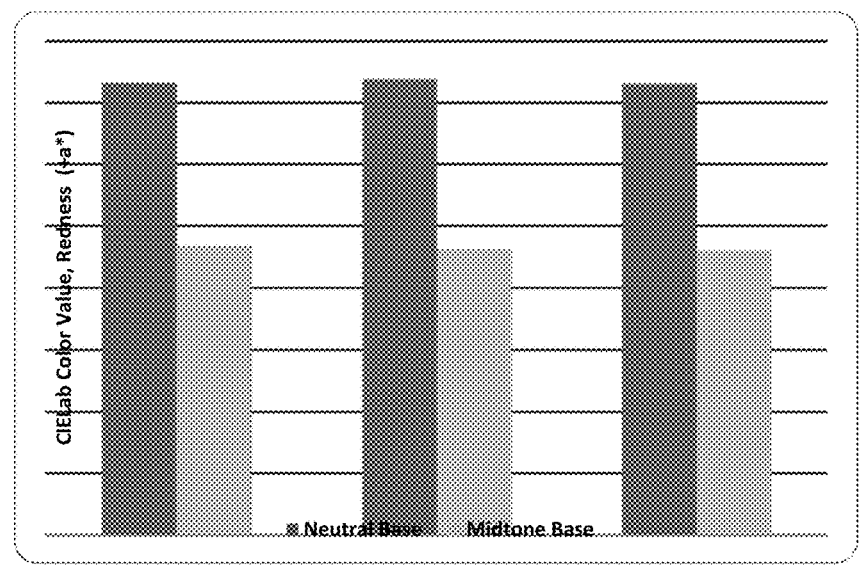
FIG. 17 is a graph comparing CIE L*a*b* redness values for paints comprising red iron oxide pigment dispersions in white base paints; the red oxide pigment dispersions are dispersions according to embodiments disclosed herein.
Figure 18:
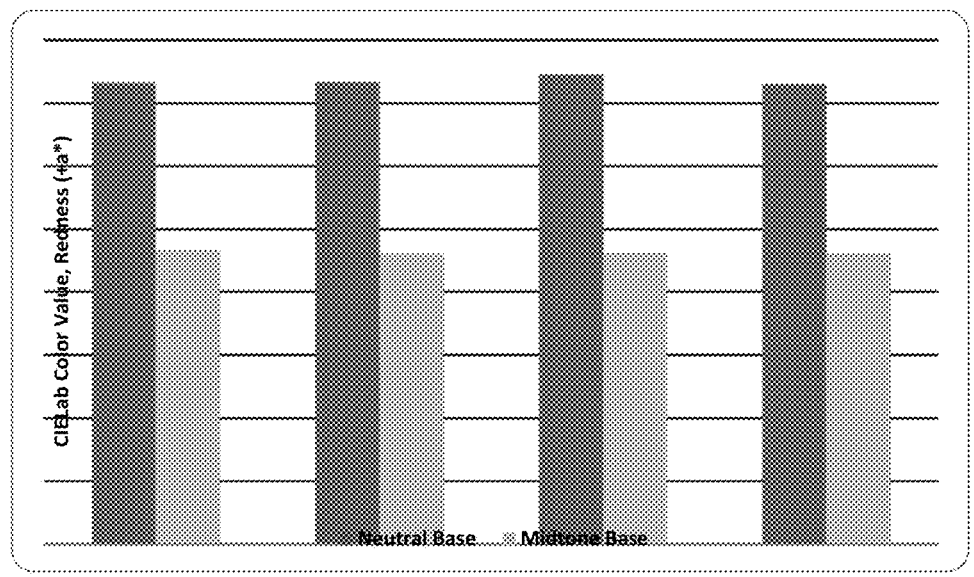
FIG. 18 is a graph comparing CIE L*a*b* redness values for paints comprising red iron oxide pigment dispersions in white base paints; the red oxide pigment dispersions are dispersions according to embodiments disclosed herein.

As illustrated in FIG. 17, the color compatibility of both the pigment dispersion comprising the lecithin-DEHA blend from Example 3 and the lecithin-DEHA blend from Example 9 are similar with and without TERGITOL™ L-62 (surfactant). The dispersions having decreased water and glass bead content and decreased dispersion time exhibited increased viscosity, increased CIE L*a*b* redness value (+a*), and maintained a 10 micron fineness of grind. The lecithin-DEHA blends readily dispersed red iron oxide pigment with and without added surfactant as shown in Table 15.

Example 20

Figure 19:
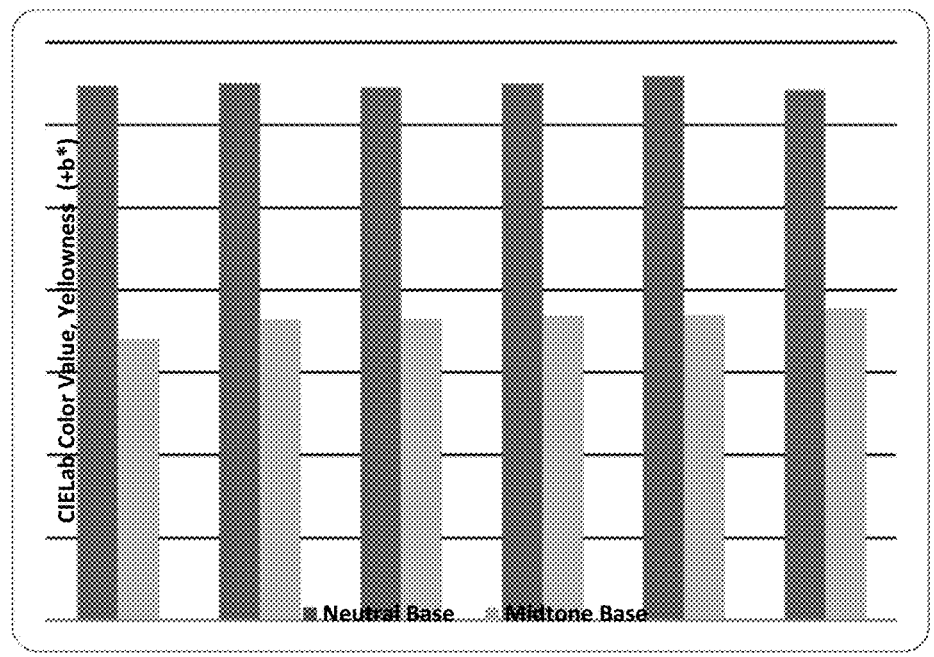
FIG. 19 is a graph comparing CIE L*a*b* yellowness values for paints comprising yellow iron oxide pigment dispersions in white base paints; the yellow oxide pigment dispersions are dispersions according to embodiments disclosed herein.

Pigment dispersions using Yellow Iron Oxide pigment (YIO R2087, Rockwood Pigments) were prepared according to the formulations presented in Table 16 (all values are mass units unless otherwise indicated). The pigment dispersion formulations were blended with commercial white neutral and mid tone base latex paint to evaluate the color compatibility of the pigment dispersions. The pigment dispersions and white-latex paints were mixed in a STIR-PAK™ mixing system (Thermo Fisher Scientific, Inc., Waltham, Mass., USA) at dial setting 2.5 for 15 minutes to produce a 2.0 g pigmented paint per 98 g base paint. Paint samples were applied on a plain white LENETA paper using a BIRD applicator at 6 mils. Rub-up test samples were prepared by rubbing the applied paint in a circular motion for about 30-45 seconds at 3 and 5 minutes after initial application. CIE L*a*b* color measurements were taken with a BYK Color-guide 45/0 color measurement instrument (BYK-Gardner USA, Columbia, Md., USA) after the films were dried overnight under ambient conditions. The results are presented in Table 17 and FIGS. 19-21.

TABLE 16

| Ingredient Formulation | Trial Formulations using Example 9 | | | | | | Supplier |
|---|---|---|---|---|---|---|---|
| | 1 | 2 | 3 | 4 | 5 | 6 | |
| water | 29.0 | 30.30 | 31.60 | 33.10 | 32.82 | 32.81 | — |
| Example 9 | 4.15 | 6.50 | 6.70 | 7.10 | 7.03 | 8.45 | ADM |
| TERGITOL L-62 (surfactant) | 3.30 | 3.45 | 3.60 | 3.80 | 4.70 | 4.70 | Dow Chemicals |
| DREWPLUS L-475 (defoamer) | 2.30 | 1.20 | 1.25 | 1.30 | 1.30 | 1.30 | Angus |
| Yellow iron oxide R2087 | 49.75 | 47.65 | 45.20 | 42.60 | 42.20 | 42.20 | Rockwood Pigments |
| water | 11.50 | 10.90 | 11.57 | 12.10 | 11.95 | 10.54 | — |
| Total % | 100 | 100 | 100 | 100 | 100 | 100 | — |

TABLE 17

| Dispersion Properties | Trial Formulations using Example 3 and Example 9 | | | | | |
|---|---|---|---|---|---|---|
| | 1 | 2 | 3 | 4 | 5 | 6 |
| % yellow iron oxide pigment | 49.75 | 47.65 | 45.20 | 42.60 | 42.20 | 42.20 |
| % dispersant on pigment | 8.33 | 13.64 | 15.00 | 16.67 | 16.67 | 20.00 |
| dispersion time (minutes) | 30 | 30 | 30 | 30 | 30 | 30 |
| dispersion speed (dial setting) | 2.5 | 2.5 | 2.5 | 2.5 | 2.5 | 2.5 |
| pigment dispersion | smooth | smooth | smooth | smooth | smooth | smooth |
| fineness of grind (microns) | 10 | 10 | 10 | 10 | 10 | 10 |
| color compatibility: amount of pigment in neutral and midtone base | 3.0 g yellow iron oxide pigment/98 g base | | | | | |

TABLE 17-continued

Trial Formulations using Example 3 and Example 9

| Dispersion Properties | 1 | 2 | 3 | 4 | 5 | 6 |
|---|---|---|---|---|---|---|
| Opacity (neutral base) | 55.54 | 61.83 | 59.13 | 59.41 | 60.17 | 64.52 |
| CIE L*a*b* value (+b*) (midtone base) | 34.05 | 36.31 | 36.43 | 36.84 | 36.91 | 37.73 |
| CIE L*a*b* value (+b*) (neutral base) | 64.77 | 65.04 | 64.51 | 65.00 | 65.90 | 64.17 |

Figure 20:
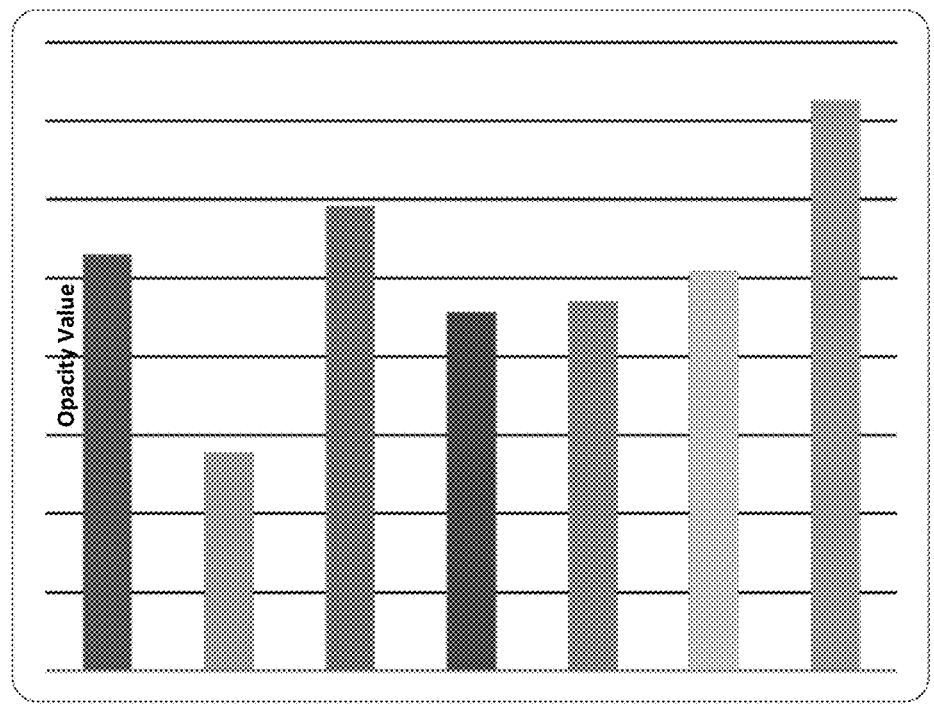
FIG. 20 is a graph comparing opacity values for paints prepared from a neutral white base and yellow iron oxide pigment dispersions according to embodiments disclosed herein.
Figure 21:
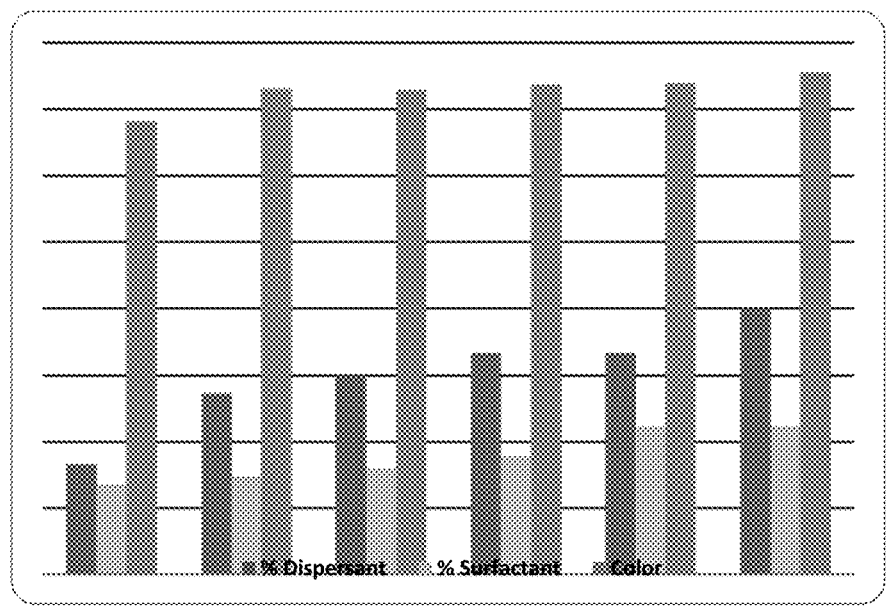
FIG. 21 is a graph comparing CIE L*a*b* yellowness values of paints prepared from a midtone white base paint and yellow iron oxide pigment dispersions according to embodiments disclosed herein; also presented are percent dispersant on pigment and percent surfactant on pigment for the dispersions according to embodiments disclosed herein.

Increasing amounts of the lecithin-DEHA blend from Example 9 and TERGITOL™ L-62 (surfactant) were used in a series of dispersions prepared according to the formulations presented in Table 16. Increased amounts of the lecithin-DEHA blend from Example 9 and TERGITOL™ L-62 (surfactant) improved the color development of the dispersions with both the midtone base and neutral base as indicated by the increased CIE L*a*b* yellowness values (+b*) presented in FIGS. 19 and 21. Opacity of the dispersions in the neutral base also increased with increased quantities of lecithin-DEHA Blend F and TERGITOL™ L-62 (surfactant) (FIG. 20).

Example 21

In another embodiment, a composition of the present invention was used as a dispersant and compared to two known dispersants. In this embodiment, a formulation of 150 grams was prepared as listed in Table 18 using a cowles blade with 100 grams of grinding beads to simulate a bead mill as a grinding machine. The dispersion speed was kept constant at 1500 rpm for 45 minutes for the three samples.

Fineness of grind was determined using Hegman grind gauge. Table 18 illustrates the pigment dispersion formulation of red iron oxide (BAYFERROX 130M) using NUOSPERSE based dispersants from Elementis and DISPERBYK from BYK, USA, and these were compared to the dispersant composition prepared in Example 3 of the present invention.

The dispersions were blended with Sherwin-Williams Exterior Acrylic Latex Gloss Extra White-6500-47574 for paint film properties. The dispersion mixtures were applied using 6 mils BIRD applicator on Penopac LENETA Paper for gloss using Micro Tri-gloss from Byk-Gardner, opacity, color and color strength using Color-guide 45/0 from Byk-Gardner.

Figure 22:
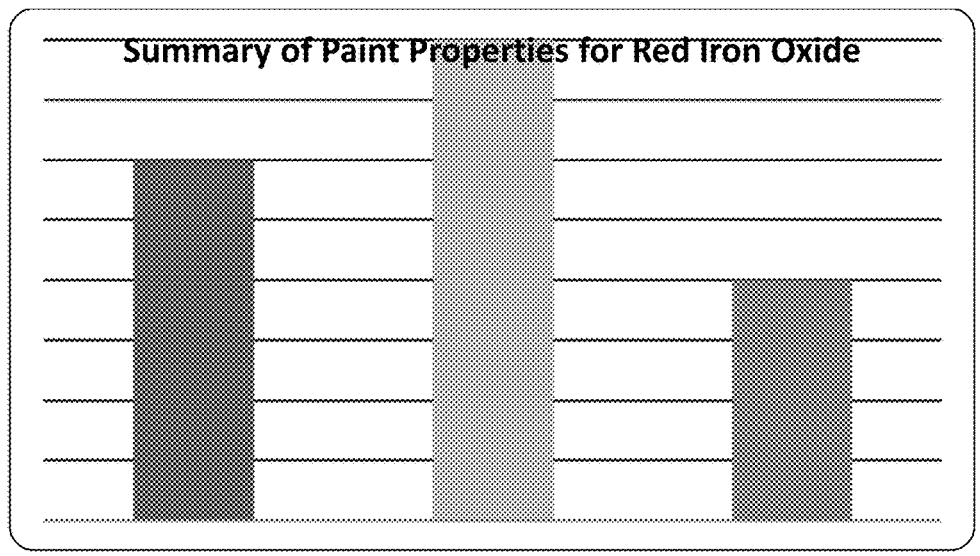
FIG. 22 shows of summary of paint film properties such as gloss, opacity, color, color strength, cost and color rub-up of one embodiment of a composition of the present invention with BAYFERROX 130M red iron oxide pigment.

Paint film properties were evaluated after 7 days drying under normal laboratory condition. Color compatibility by rub-up method was taken 5 minutes after application. The summary of the paint properties of the dispersants of Table 18 are presented in FIG. 22.

Example 22

In another embodiment, a composition of the present invention was used as a dispersant and compared to two known dispersants. In this embodiment, a pigment dispersion of 150 grams was prepared as listed in Table 19 using a cowles blade with 100 grams of grinding beads to simulate a bead mill as a grinding machine. The dispersion speed was kept constant at 1500 rpm for 45 minutes for the three samples.

Fineness of grind was determined using Hegman grind gauge. Table 19 illustrates the pigment dispersion formulation of Pigment Black 7 (MOGUL E) using NUOSPERSE— dispersants from Elementis, and these were compared to the dispersant composition prepared in Example 9 of the present invention.

TABLE 18

Red Iron Oxide Pigment Dispersion.

| Raw Materials | Description | NUOSPERSE (dispersant) | Example 3 | DISPERBYK (dispersant) | Suppliers |
|---|---|---|---|---|---|
| Water | | 23.43 | 28.0 | 16.52 | |
| PEG 200 | Humectant | | | 9.55 | Dow |
| Example 3 | Dispersant | | 8.00 | | ADM |
| NUOSPERSE FX 365 | Dispersant | 8.61 | | | Elementis |
| NUOSPERSE FX 600 | Dispersant | 5.55 | | | Elementis |
| DISPERBYK 192 | Dispersant | | | 4.68 | BYK-USA |
| DISPERBYK 180 | Dispersant | | | 1.24 | BYK-USA |
| TERGITOL L-62 | Surfactant | | 8.00 | | Dow |
| DAPRO 7015 | Defoamer | 0.48 | | | Elementis |
| BYK 021 | Defoamer | | | 0.96 | BYK-USA |
| DREWPLUS L 475 | Defoamer | | 1.0 | | Rohm and Haas |
| BYK 420 | Rheology modifier | | | 0.48 | BYK-USA |
| BAYFERROX 130 M | Red Iron Oxide | 57.70 | 55.0 | 62.10 | Lanxess |
| Water | | 3.83 | | 4.46 | |
| Total | | 100.00% | 100.00% | 100.00% | |

TABLE 19

Pigment Black 7 MOGUL E Pigment Dispersion.

| Raw materials | Description | NUOSPERSE (dispersant) | Example 9 | Suppliers |
|---|---|---|---|---|
| Water | — | 41.67 | 42.10 | — |
| Example 9 | Dispersant | — | 12.20 | ADM |
| NUOSPERSE FX 365 | Dispersant | 6.60 | — | Elementis |
| NUOSPERSE FX 600 | Dispersant | 2.00 | — | Elementis |
| TERGITOL L-62 | Surfactant | — | 6.65 | Dow |
| AMP-95 | Neutralizer | — | 0.83 | Dow |
| DREWPLUS L-475 | Defoamer | — | 1.66 | Dow |

TABLE 19-continued

Pigment Black 7 MOGUL E Pigment Dispersion.

| Raw materials | Description | NUOSPERSE (dispersant) | Example 9 | Suppliers |
|---|---|---|---|---|
| DAPRO 7015 | Defoamer | 1.00 | — | Elementis |
| MOGUL E | Carbon Black Pigment | 40.00 | 27.70 | Cabot |
| Water | — | 8.50 | 8.86 | — |
| ACRYSOL SCT-275 | Rheology modifier | 0.23 | — | Rohm and Haas |
| Total | — | 100.00% | 100.00% | |

Figure 23:
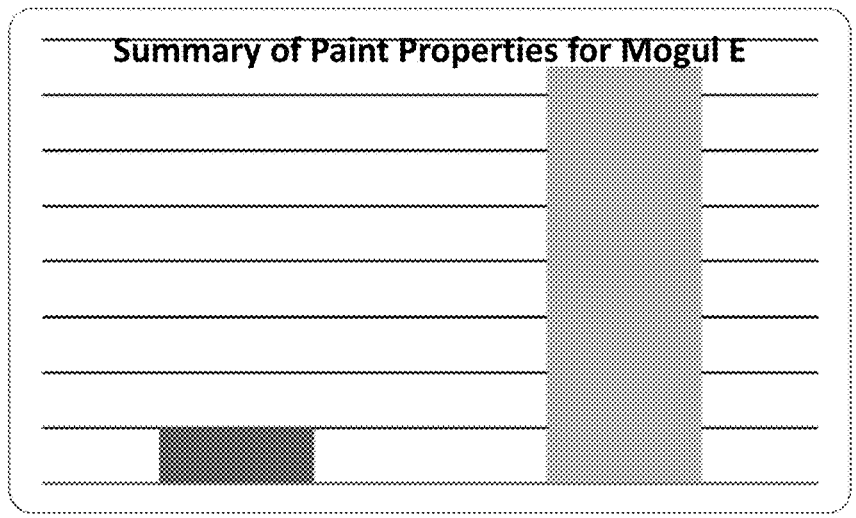
FIG. 23 shows summary of paint film properties such as gloss, opacity, color, color strength, cost and color rub-up of one embodiment of a composition of the present invention with black MOGUL E pigment.

The dispersions were blended with Sherwin-Williams Superpaint Exterior Acrylic latex Gloss Extra White-6500-47574 for paint film properties. The dispersion mixtures were applied using 6 mils BIRD Applicator on Penopac LENETA Paper for gloss using Micro Tri-gloss from Byk-Gardner, opacity. Color and color strength using Color-guide 45/0 from Byk-Gardner. Paint film properties were evaluated after 7 days drying under normal laboratory condition. Color compatibility by rub-up method was taken 5 minutes after the application. The summary of all the paint properties with the different dispersants are shown in FIG. 23.

Example 23

In another embodiment, a composition of the present invention was used as a dispersant and compared to two known dispersants. In this embodiment, a formulation of 150 grams was prepared as listed in Table 20 using a cowles blade with 100 grams of grinding beads to simulate a bead mill as a grinding machine. The dispersion speed was kept constant at 1500 rpm for 45 minutes for the three samples.

Fineness of grind was determined using Hegman grind gauge. Table 20 illustrates the pigment dispersion formulation of yellow iron oxide (BAYFERROX 3910) using NUOSPERSE based dispersants from Elementis and DISPERBYK from BYK, USA, and these were compared to the dispersant composition prepared in Example 3 of the present invention.

TABLE 20

Yellow Iron Oxide Pigment Dispersion.

| Raw Materials | Description | NUOSPERSE (dispersant) | Example 3 | DISPERBYK (dispersant) | Suppliers |
|---|---|---|---|---|---|
| Water | | 32.79 | 32.75 | 28.30 | |
| PEG 200 | Humectant | | | 10.00 | Dow |
| Example 3 | Dispersant | | 8.34 | | ADM |
| NUOSPERSE FX 365 | Dispersant | 3.36 | | | Elementis |
| NUOSPERSE FX 600 | Dispersant | 7.13 | | | Elementis |
| DISPERBYK 192 | Dispersant | | | 4.10 | BYK-USA |
| DISPERBYK 180 | Dispersant | | | 1.10 | BYK-USA |
| TERGITOL L-62 | Surfactant | | 3.93 | | Dow |
| DAPRO 7015 | Defoamer | 0.51 | | | Elementis |
| BYK 021 | Defoamer | | | 1.00 | BYK-USA |
| DREWPLUS L 475 | Defoamer | | 0.98 | | Dow |
| ACRYSOL SCT-275 | Rheology modifier | 0.20 | | | Rohm and Haas |
| BYK 420 | Rheology modifier | | | 0.50 | BYK-USA |
| BAYFERROX 3910 (Pigment) | Yellow Iron oxide | 56.01 | 54.00 | 55.00 | Lanxess |
| Total | | 100.00% | 100.00% | 100.00% | |

The dispersions were blended with Sherwin-Williams Superpaint Exterior Acrylic latex Gloss Extra White-6500-47574 for paint film properties. The dispersion mixtures were applied using 6 mils BIRD Applicator on Penopac LENETA Paper for gloss using Micro Tri-gloss from Byk-Gardner, opacity. Color and color strength using Color-guide 45/0 from Byk-Gardner.

Figure 24:
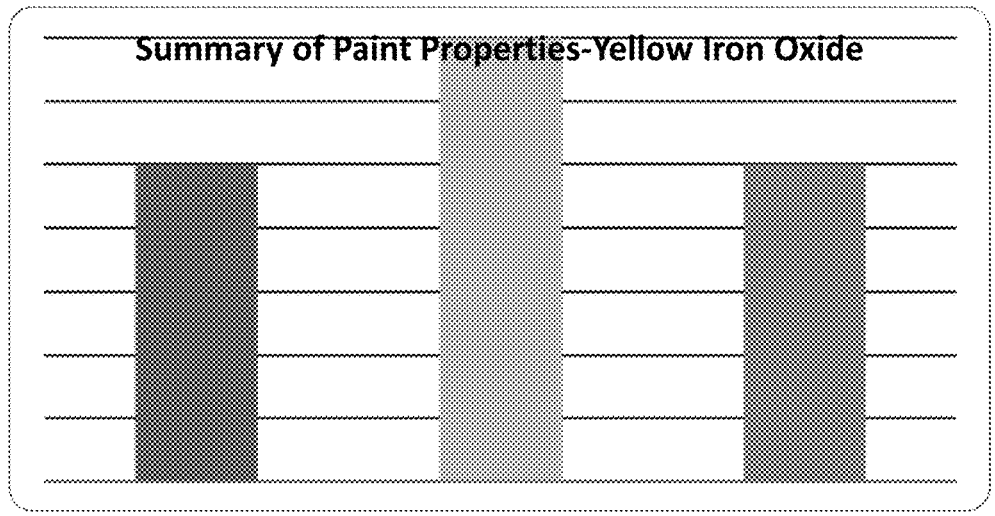
FIG. 24 shows summary paint film properties such as gloss, opacity, color, color strength, cost and color rub-up of one embodiment of a composition of the present invention BAYFERROX 3910 yellow iron oxide pigment.

Paint film properties were evaluated after 7 days drying under normal laboratory condition. Color compatibility by rub-up method was taken 5 minutes after application. The summary of the paint properties of the dispersants of Table 20 are presented in FIG. 24.

Example 24

In another embodiment, a composition of the present invention was used as a dispersant and compared to two known dispersants. In this embodiment, a formulation of 150 grams was prepared as listed in Table 21 using a cowles blade with 100 grams of grinding beads to simulate a bead mill as a grinding machine. The dispersion speed was kept constant at 1500 rpm for 45 minutes for the three samples.

Fineness of grind was determined using Hegman grind gauge. Table 21 illustrates the pigment dispersion formulation of pigment blue 15:3 (LANSCO 5567C) using NUOSPERSE based dispersants from Elementis and DISPERBYK from BYK, USA, and these were compared to the dispersant composition prepared in Example 9 of the present invention.

TABLE 21

LANSCO Pigment Blue 15:3 Pigment Dispersion.

| Raw Material | Description | NUOSPERSE (dispersant) | Example 9 | DISPERBYK (dispersant) | Suppliers |
|---|---|---|---|---|---|
| Water | | 45.50 | 38.35 | 26.67 | |
| PEG 200 | Humectant | | | 10.00 | Dow |
| Example 9 | Dispersant | | 11.00 | | ADM |
| NUOSPERSE FX365 | Dispersant | 11.00 | | | Elementis |
| NUOSPERSE FX600 | Dispersant | 3.00 | | | Elementis |
| DISPERBYK 192 | Dispersant | | | 8.00 | BYK-USA |
| TERGITOL L-62 | Surfactant | | 5.80 | | Dow |
| AMP-95 | Neutralizer | | 0.75 | | Dow |
| BYK 022 | Defoamer | | 0.75 | | BYK-USA |
| DAPRO 7015 | Defoamer | 0.50 | | | Elementis |
| BYK 021 | Defoamer | | | 1.00 | BYK-USA |
| LANSCO Blue 5576C | Blue Pigment | 40.00 | 29.00 | 40.00 | Lansco |
| Water | | | 14.35 | 14.33 | |
| Total | | 100.00% | 100.00% | 100.00% | |

The dispersions were blended with Sherwin-Williams Superpaint Exterior Acrylic Latex Gloss Extra White-6500-45754 for paint film properties. The dispersion mixtures were applied using a 6 mils BIRD applicator on Penopac LENETA Paper for gloss using Micro Tri-gloss from Byk-Gardner, opacity, color and color strength using Color-guide 45/0 from Byk-Gardner.

Figure 25:
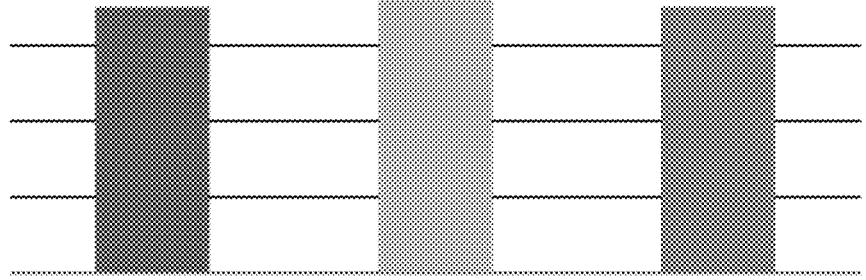
FIG. 25 illustrates summary of paint film properties such as gloss, opacity, color, color strength, cost and color rub-up of one embodiment of a composition of the present invention with LANSCO 5576-C blue pigment.

Paint film properties were evaluated after 7 days drying under normal laboratory condition. Color compatibility by rub-up method was taken 5 minutes after application. The summary of the paint properties of the dispersants of Table 21 are presented in FIG. 25.

Example 25

In another embodiment, a composition of the present invention was used as a dispersant and compared to a known dispersant. In this embodiment, a formulation of 150 grams was prepared as listed in Table 22 using a cowles blade with 100 grams of grinding beads to simulate a bead mill as a grinding machine. The dispersion speed was kept constant at 1500 rpm for 45 minutes for the three samples.

Fineness of grind was determined using Hegman grind gauge. Table 22 illustrates the pigment dispersion formulation of pigment black 7 (MONARCH 1100) using the dispersant DISPERBYK from BYK, USA, and this was compared to the dispersant composition prepared in Example 9 of the present invention.

TABLE 22

Pigment Black 7 MONARCH 1100 Pigment Dispersion.

| Raw Materials | Description | Example 9 | DISPERBYK (dispersant) | Suppliers |
|---|---|---|---|---|
| Water | | 53.05 | 38.50 | |
| Example 9 | Dispersant | 11.67 | | ADM |
| DISPERBYK 190 | Dispersant | | 38.50 | Byk-USA |
| TERGITOL L-62 | Surfactant | 6.37 | | Dow |
| AMP-95 | Neutralizer | 0.80 | | Dow |
| BYK 024 | Defoamer | | 1.00 | Byk-USA |
| DREWPLUS L-475 | Defoamer | 1.59 | | Dow |
| MONARCH 1100 | Carbon Black Pigment | 26.52 | 22.00 | Cabot |
| Total | | 100.00% | 100.00% | |

The dispersions were blended with Sherwin-Williams Superpaint Exterior Acrylic Latex Gloss Extra White-6500-47574 for paint film properties. The dispersion mixtures were applied using a BIRD Applicator on Penopac LENETA Paper for gloss using Micro Tri-gloss from Byk-Gardner, opacity, color and color strength using Color-guide 45/0 from Byk-Gardner.

Figure 26:
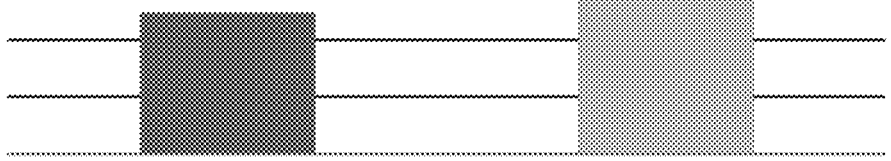
FIG. 26 illustrates summary of paint film properties such as gloss, opacity, color, and color strength, cost and color rub-up of one embodiment of a composition of the present invention with MONARCH 1100 black pigment.

Paint film properties were evaluated after 7 days drying under normal laboratory conditions. Color compatibility by rub-up method was taken 5 minutes after application. The summary of the paint properties of the dispersants of Table 22 are presented in FIG. 26.

Example 26

This embodiment illustrates the ability of the compositions of the present invention to disperse pigments in water and resins, such as for an ink application. Table 23A illustrates the pigment dispersion in water and Table 23B illustrates the pigment dispersion of Pigment Blue 15:3 (Hostasperm B2G) in a resin.

TABLE 23A

Formulation- Blue Pigment dispersion in water

| Raw Materials | ADM | Ethox | Huntsman | Supplier |
|---|---|---|---|---|
| Water | 35.00 | 40.00 | 40.00 | — |
| Example 9 | 11.00 | — | — | ADM |
| E-SPERSE 100 (dispersant) | — | 2.93 | — | Ethox Chemicals |
| E-SPERSE 506 (dispersant) | — | 2.00 | — | Ethox Chemicals |
| JEFFSPERSE X3204 (dispersant) | — | — | 4.90 | Huntsman |
| TERGITOL L-62 (surfactant) | 5.80 | — | 1.59 | Dow Chemical |
| AMP-95 (neutralizer) | 0.75 | — | — | Dow Chemical |
| BYK-022 (defoamer) | 0.75 | 1.00 | 1.00 | BYK-USA |
| Hostaperm B2G-D (pigment) | 29.00 | 40.00 | 37.00 | Clariant Chemicals |
| Water | 11.70 | 3.50 | — | — |
| Water | 6.00 | — | — | — |
| Water | — | (10.5) | (15.51) | — |
| Total % | 100.00 | 100.00 | 100.00 | — |

TABLE 23B

Blue Pigment dispersion in resin.

| Raw Materials | Description | Ethox | Example 9 | Huntsman | Commercial Supplier |
|---|---|---|---|---|---|
| JONCRYL 63 | Dispersion Resin | 28.00 | 19.70 | 28.00 | BASF |
| Water | | 31.73 | 36.47 | 29.20 | |
| TERGITOL L-62 | Surfactant | — | 1.09 | — | Dow Chemical |
| Example 9 | Dispersant | — | 9.48 | — | ADM |
| JEFFSPERSE X3204 | Dispersant | — | — | 4.90 | Huntsman |
| E-SPERSE 506 | Dispersant | 1.27 | — | — | Ethox Chemicals |
| BYK 022 | Defoamer | 1.00 | 0.44 | 0.90 | BYK USA |
| Hostaperm B2G-D | Blue Pigment | 38.00 | 32.82 | 37.00 | Clariant Chemicals |
| Total | | 100.00 | 100.00 | 100.00 | |

150 gram dispersions of pigments were carried out using a cowles blade with 100 grams of grinding beads to simulate a bead mill as a grinding machine. The dispersion speed was kept contact at 2000+/−10 rpm and dispersed for 75 minutes. The fineness of the grind was determined using an NPIRI grind gauge.

The pigment dispersion was completed to make a blue ink according to the formulation of Table 24. The pigmentation was at 14% with equal resin solids content and PVC for the three ink samples. The ink was applied on LENETA Plastic film using application rod #20 to determine film finish using a microscope. Anilox hand proofer was used to apply the ink on LENETA 3NT-31 for color and color strength as applied on a paper. The color and color intensity were determined using Color-guide 45/0 from BYK-Gardner.

TABLE 24

Color strength at 3% pigmentation with semi-gloss latex white.

| Raw Materials | Description | Ethox | Example 9 | Huntsman |
|---|---|---|---|---|
| Pigment Dispersion | | 36.84 | 42.65 | 37.84 |
| JONCRYL 63 (BASF) | Dispersing Resin | 1.93 | 2.90 | 1.35 |
| JONCRYL 60 (BASF) | Dispersing Resin | 16.40 | 15.13 | 16.00 |
| JONCRYL 60 (BASF) | Dispersing Resin | 16.40 | 15.13 | 16.00 |
| Water | | 2.19 | — | 3.20 |
| Total | | 100.00 | 100.00 | 100.00 |

The pigment dispersion was blended with 100 grams of Sherwin-Williams Superpaint Interior Semigloss Latex 6405-12935 at 3% pigmentation for color and color compatibility. Color and color strength were determined using Color-guide 45/0 from BYK-Gardner.

Figures 27A, 27B:
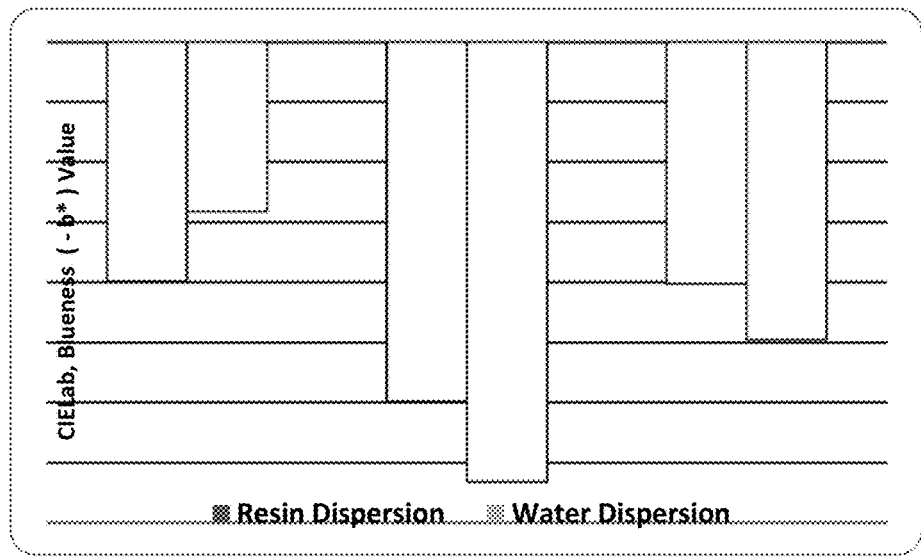
FIG. 27A illustrates the blueness of pigment blue in resin dispersion in an ink formulation and pigment blue in water dispersion added to semi gloss latex.
FIG. 27B shows the fineness of grind of pigment blue in resin and water dispersions.
Figure 27C:
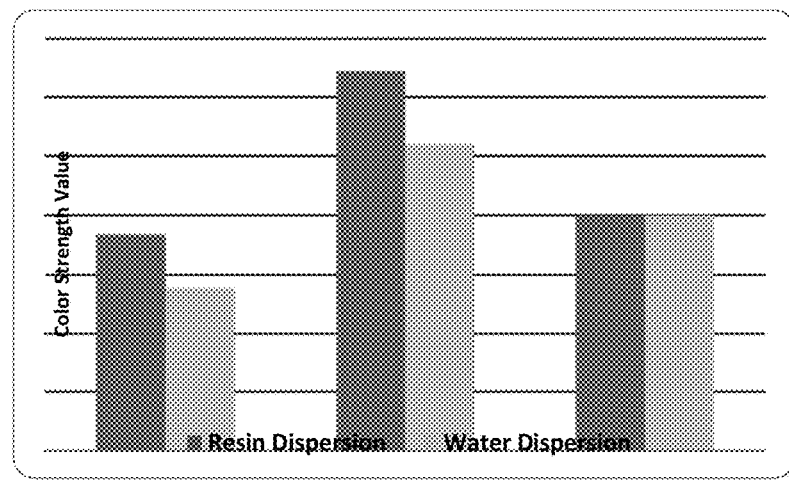
FIG. 27C depicts the color strength of pigment blue in resin dispersion in an ink formulation and water dispersion added to semi gloss latex.

The dispersion of the composition of Example 9 showed improved color intensity in the ink formulation and in blends with white semigloss latex as shown in FIG. 27A, which could be attributed to the better dispersion shown in FIG. 27B. The composition of Example 9 also showed better color strength as shown in FIG. 27C. FIG. 27A shows the blueness of resin dispersion in an ink application and water dispersion in semigloss latex. FIG. 27B shows the fineness of the grind of the resin and water dispersion. FIG. 27C shows the color strength of the resin dispersion in ink let down and water dispersion with semigloss latex.

Figure 28:
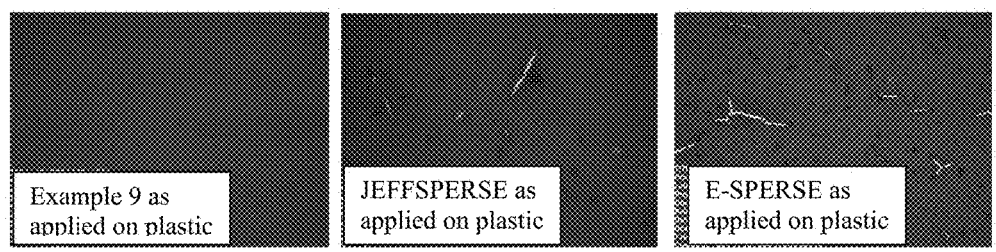
FIG. 28 shows film formation of ink formulation as applied on plastic film using application rod #20. The first panel shows the film formation using the composition of Example 9 as a dispersant; the second panel using JEFFSPERSE as the dispersant; and the third panel using E-SPERSE as a dispersant.

FIG. 28 illustrates photo micrographs of the film formation of the ink as applied on LENETA plastic film using application rod #20. The composition of Example 9 showed complete film formation (absence of cracks) while the Ethox and Huntsman dispersants showed poor film formation as evident from the cracks shown in the micrographs of FIG. 28.

Example 27

In this embodiment, the ability of the compositions of the present invention to disperse pigments in water and resins, such as for an ink application, is described. Table 25A illustrates the pigment dispersion in water using the composition of Example 9 and Table 25B illustrates the pigment dispersion of Pigment Black (REGAL 660R) in a resin using the composition of Example 9.

150 gram dispersions of pigments were carried out using a cowles blade with 100 grams of grinding beads to simulate a bead mill as a grinding machine. The dispersion speed was kept contact at 2000+/−10 rpm and dispersed for 75 minutes. The fineness of the grind was determined using an NPIRI grind gauge.

TABLE 25A

Carbon Black in Water Dispersion.

| Raw Materials | Description | Example 9 | Ethox | Huntsman | Supplier |
|---|---|---|---|---|---|
| Water | | 44.0 | 40.87 | 37.32 | |
| Example 9 | Dispersant | 11.0 | — | — | ADM |
| E-SPERSE 100 | Dispersant | — | 6.65 | — | Ethox Chemical |
| JEFFSPERSE X3204 | Dispersant | — | — | 4.88 | Huntsman |
| TERGITOL L-62 | Surfactant | 5.80 | — | 2.88 | Dow |
| AMP-95 | Neutralizer | 0.75 | — | — | Dow |
| DREWPLUS L-475 | Defoamer | 1.80 | — | — | Dow |
| DEFOAMER 31 | Defoamer | — | 1.40 | — | Ethox Chemical |
| BYK-022 | Defoamer | — | — | 1.08 | BYK-USA |
| REGAL Black 660R | Carbon Black | 22.00 | 38.31 | 35.45 | Cabot |
| Water | | 14.65 | 12.77 | 17.69 | |
| Total % | | 100.00 | 100.00 | 100.00 | |

TABLE 25B

Carbon Black in Resin Dispersion.

| Raw Materials | Description | ADM | Ethox | Huntsman | Suppliers |
|---|---|---|---|---|---|
| JONCRYL 63 | Dispersing Resin | 21.21 | 28.00 | 28.00 | BASF |
| Water | | 39.24 | 28.00 | 28.00 | |
| Example 9 | Dispersant | 9.54 | — | — | ADM |
| E-SPERSE 506 | Dispersant | — | 1.25 | 5.10 | Ethox Chemical |
| JEFFSPERSE X3204 | Dispersant | — | — | — | Huntsman |
| TERGITOL L-62 | Surfactant | 2.12 | — | — | Dow |
| AMP-95 | Neutralizer | 0.32 | — | — | Dow |
| DREWPLUS L-475 | Defoamer | 1.06 | — | — | Dow |
| BYK-022 | Defoamer | — | 1.00 | 0.90 | Byk-USA |
| REGAL Black 660R | Carbon Black Pigment | 26.51 | 37.50 | 38.00 | Cabot |
| Water | | — | 4.25 | — | |
| Total % | | 100.00 | 100.00 | 100.00 | |

The pigment dispersion of Table 25B was completed to make a black ink according to the specification shown in Table 26. The pigmentation was at 14% with equal resins solids content and PVC for all three samples. Ink was applied on LENETA Plastic film using application rod #20 to determine the film finish using a microscope. Anilox hand proofer was used to apply the ink on LENETA 3NT-31 for color and color strength as applied on a paper. Color and color intensity were determined using Color-guide 45/0 from BYK-Gardner.

The pigment dispersion was blended with 100 g of Sherwin-Williams Superpaint Interior Semigloss Latex 6405-12935 at 3% pigmentation for color and color compatibility. Color and color strength were determined using Color-guide 45/0 from BYK-Gardner.

TABLE 26

Ink Letdown for Carbon Black Resin Dispersion.

| Raw Materials | Description | ADM | Ethox | Huntsman | Huntsman Reference @10.0% Pigment | Emulsion Ratio based on Huntsman |
|---|---|---|---|---|---|---|
| Resin Dispersion | | 37.72 | 26.67 | 26.32 | 40.00 | |
| JONCRYL 63 | Dispersing Resin | 3.06 | 5.24 | 5.38 | — | 17.18 |
| JONCRYL Eco 2117 | Dispersing Resin | 38.50 | 44.26 | 44.40 | 39.00 | 59.82 |
| JONCRYL 60 | Dispersing Resin | 14.80 | 17.02 | 17.08 | 15.00 | 23.00 |
| Water | | 5.92 | 6.81 | 6.83 | 6.00 | |
| Total % | | 100.00 | 100.00 | 100.00 | 100.00 | 100.00 |

Figure 29:
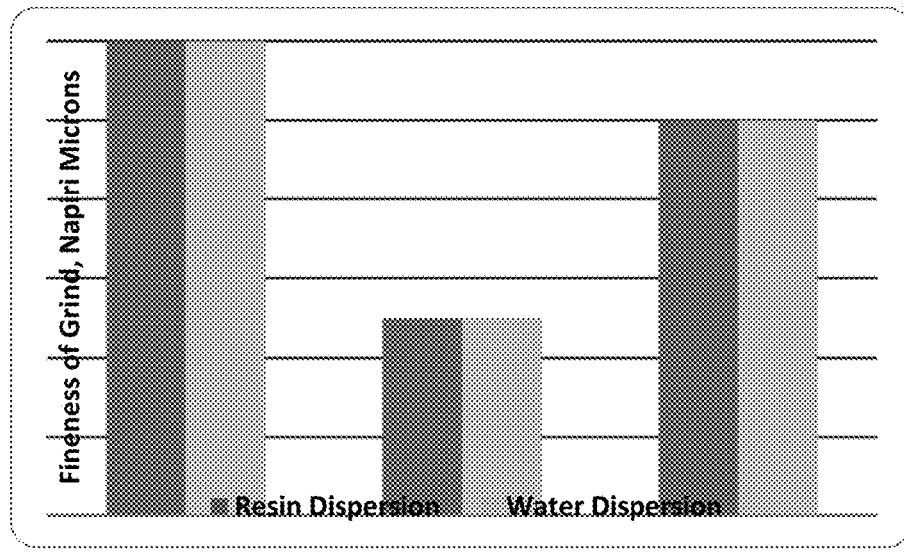
FIG. 29 shows the fineness of grind of pigment black in resin dispersion in an ink formulation and water dispersion added to a semi-gloss latex.
Figure 30:
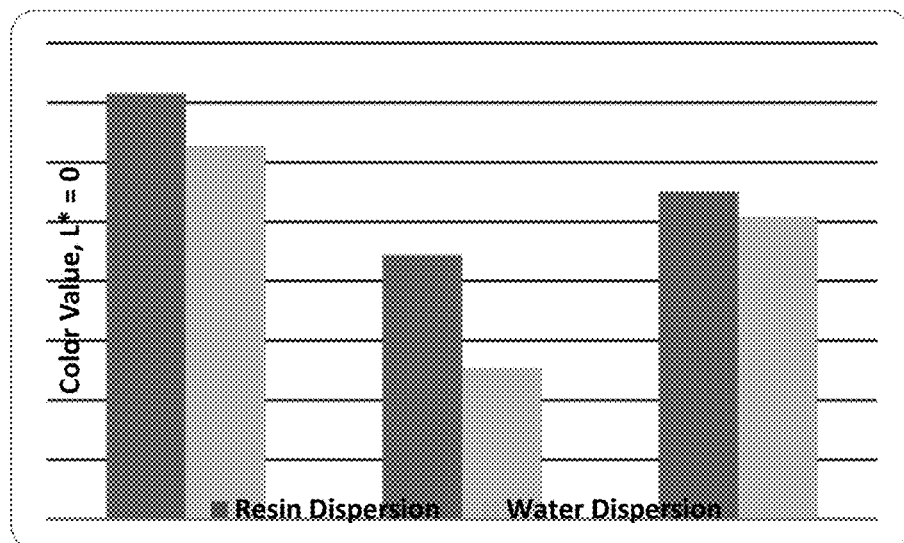
FIG. 30 shows color intensity of pigment black in resin dispersion in an ink formulation and water dispersion added to a semi-gloss latex.

The dispersion prepared using the composition of Example 9 showed better dispersion than NUOSPERSE and Huntsman dispersants as shown by its Fineness of Grind as illustrated in FIG. 29. The composition of Example 9 also showed improved color intensity when blended with white semigloss latex as shown in FIG. 30.

Figure 31:
FIG. 31 illustrates film formation of ink formulation as applied on plastic film using application rod #30. The first panel uses the composition of Example 9 as a dispersant; the second panel uses E-SPERSE as a dispersant; and the third panel uses JEFFSPERSE as a dispersant.

FIG. 31 illustrates photo micrographs of the film formation of the ink applied on LENETA plastic film using application rod #30. The composition of Example 9 showed complete film formation (absence of cracks) while the dispersants of Ethox and Huntsman showed poor film formation as evident from the cracks shown on the micrographs. The color intensity was not determined for NUOSPERSE and Huntsman due to the incomplete film formation as shown in FIG. 31.

Example 28

A blend of 80% crude filtered lecithin (YELKIN T, Archer-Daniels-Midland Company, Decatur, Ill. USA) and 20% polyglycerol ester (DREWPOL 3-5-CC, Stepan, Northfield, Ill., USA) was prepared. The blend was prepared by heating the lecithin in a beaker at approximately 50° C. under constant stirring. As the lecithin began to melt, the polyglycerol ester (having an HLB of 3) was added. The blend was cooled to room temperature of about 25° C. and the viscosity was measured to be about 1000 cp.

Example 29

Figure 32A:
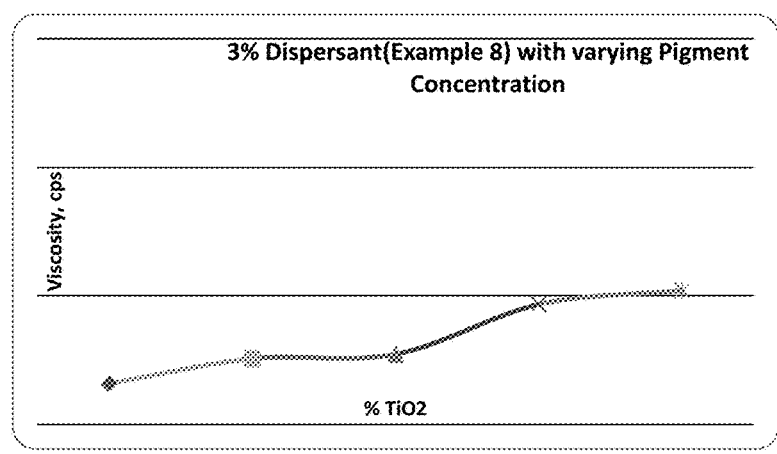
FIG. 32A shows the viscosity profile of titanium dioxide pigment dispersions in 3% dispersant at different pigment concentrations.
Figure 32B:
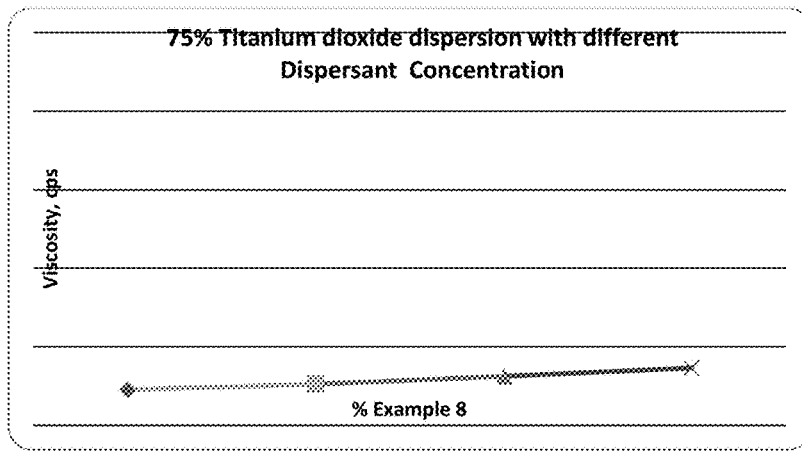
FIG. 32B shows the viscosity profile of titanium dioxide dispersions with varying dispersant concentrations.

FIGS. 32A and 32B illustrate the pigment dispersion ability of the composition of Example 7 used as a dispersant using glycerol tricaprylate/caprate (GTCC) as the carrier liquid and titanium dioxide as the pigment. The dispersion was carried out using high speed dispersion with a cowles blade for 30 minutes at 2000 rpm for titanium dioxide and 1200 rpm for iron oxides. The fineness of the dispersion was taken using a Hegman grind gauge. The viscosity of each of the pigment dispersion was measured using a Brookfield viscometer.

The present invention has been described with reference to certain exemplary and illustrative embodiments, compositions and uses thereof. However, it will be recognized by persons having ordinary skill in the art that various substitutions, modifications or combinations of any of the exemplary embodiments may be made without departing from the scope of the invention. Thus, the invention is not limited by the description of the exemplary and illustrative embodiments, but rather by the appended claims.

What is claimed is:

1. A method of dispersing a pigment in a paint, the method comprising:
   mixing a bio-derived dispersant and the pigment with a paint formulation;
   wherein the bio-derived dispersant comprises lecithin and a plasticizer selected from the group consisting of a citrate, an adipate, a pentaerythritol ester, an isosorbide ester, and combinations of any thereof.

2. The method according to claim 1, wherein bio-derived dispersant further comprises a plasticizer selected from the group consisting of propylene glycol monoester (PGME), butyl benzyl phthalate (BBP), di-n-butyl maleate (DBM), di-n-butyl phthalate (DBP), diethylene glycol dibenzoate (DEGD), di(2-ethylhexyl) phthalate (DEHP), dioctyl phthalate (DOP), diethyl phthalate (DEP), diisobutyl phthalate (DIBP), diisodecyl adipate (DIDA), diisodecyl phthalate (DIDP), diisoheptyl phthalate (DIHP), diisononyl adipate (DINA), diisononyl cyclohexane-1,2-dicarboxylate (DINCH), diisononyl phthalate (DINP), diisooctyl adipate (DIOA), diisooctyl phthalate (DIOP), dimenthyl phthalate (DMP), di-n-hexyl phthalate (DnHP), di-n-octyl adipate (DnOA), di-n-octyl phthalate (DnOP), dinonyl phthalate (DNP), dioctyl adipate (DOA), di-(2-ethylhexyl) adipate (DEHA), dioctyl maleate (DOM), dioctyl sebacate (DOS), dioctyl terephalate (DOTP), dioctyl azelate (DOZ), dipropylene glycol dibenzoate (DPGB), di(2-propylheptyl) phthalate (DPHP), ditridecyl adipate (DTDA), ditridecyl phthalate (DTDP), diundecyl phthalate (DUP), 2-ethylhexanol (2-EH), epoxidized linseed oil (ELO), epoxidized soybean oil (ESO), general-purpose phthalate (GPP), isodecyl alcohol (IDA), isononyl alcohol (INA), phthalic anhydride (PA), 2-propylheptanol (2-PH), polyvinyl chloride (PVC), tricresyl phosphate (TCP), triisononyl trimellitate (TINTM), triisooctyl trimellitate (TIOTM), trimellitic anhydride (TMA), trioctyl trimellitate (TOTM), triphenyl phosphate (TPP), trixylyl phosphate (TXP), undecyl dodecyl phthalate (UDP), soybean oil, medium chain triglycerides, a polyglycerol ester and combinations of any thereof.

3. The method according to claim 1, wherein the lecithin is selected from the group consisting of crude filtered lecithin, de-oiled lecithin, chemically modified lecithin, enzymatically modified lecithin, standardized lecithin, and combinations of any thereof.

4. The method according to claim 1, wherein:
the lecithin comprises from 5% to 95% by weight of the bio-derived dispersant, and
the plasticizer comprises from 5% to 95% by weight of the bio-derived dispersant.

5. The method according to claim 1, wherein the bio-derived dispersant comprises less than 5 g/L of volatile organic compounds.

6. The method according to claim 1, wherein the bio-derived dispersant further comprises a surfactant selected from the group consisting of an anionic surfactant, a non-ionic surfactant and combinations of any thereof.

7. The method according to claim 6, wherein the surfactant has a hydrophilic-lipophilic balance of between 10.0 and 24.0.

8. The method according to claim 6, wherein the non-ionic surfactant is selected from the group consisting of sorbitan monostearate, polyoxyethylene ester of rosin, polyoxyethylene dodecyl mono ether, polyoxyethylene-polyoxypropylene block copolymer, polyoxyethylene monolaurate, polyoxyethylene monohexadecyl ether, polyoxyethylene monooleate, polyoxyethylene mono(cis-9-octadecenyl) ether, polyoxyethylene monostearate, polyoxyethylene monooctadecyl ether, polyoxyethylene dioleate, polyoxyethylene distearate, polyoxyethylene sorbitan monolaurate polyoxyethylene sorbitan monooleate, polyoxyethylene sorbitan monopalmitate, polyoxyethylene sorbitan monostearate, polyoxyethylene sorbitan trioleate, polyoxyethylene sorbitan tristearate, polyglycerol ester of oleic acid, polyoxyethylene sorbitol hexastearate, polyoxyethylene monotetradecyl ether, polyoxyethylene sorbitol hexaoleate, fatty acids, tall-oil, sorbitol hexaesters, ethoxylated castor oil, ethoxylated soybean oil, ethoxylated polyoxyethylene sorbitol tetraoleate, glycerol and polyethylene glycol mixed esters, alcohols, polyglycerol esters, monoglycerides, sucrose esters, derivatives of any thereof, and combinations of any thereof.

9. The method according to claim 6, wherein the anionic surfactant is selected from the group consisting of sodium and potassium salts of straight-chain fatty acids, polyoxyethylenated fatty alcohol carboxylates, linear alkyl benzene sulfonates, alpha olefin sulfonates, sulfonated fatty acid methyl ester, arylalkanesulfonates, sulfosuccinate esters, alkyldiphenylether(di)sulfonates, alkylnaphthalenesulfonates, isoethionates, alkylether sulfates, sulfonated oils, fatty acid monoethanolamide sulfates, polyoxyethylene fatty acid monoethanolamide sulfates, aliphatic phosphate esters, nonylphenolphosphate esters, fluorinated anionics, and combinations of any thereof.

10. The method according to claim 1, wherein the pigment is selected from the group consisting of an organic pigment, an inorganic pigment, a carbon black pigment, and any combinations thereof.

11. The method according to claim 1, wherein the bio-derived dispersant has a viscosity of 2,000 centipoise or less at 25° C.

12. The method according to claim 1, wherein the pigment is titanium dioxide, aluminum silicate, or a combination thereof.

13. A method of dispersing a pigment in a paint base, the method comprising:
mixing a bio-derived dispersant comprising a plasticizer selected from the group consisting of a citrate, an adipate, a pentaerythritol ester, an isosorbide ester, and combinations of any thereof with the paint base; and
mixing a pigment with the paint base.

14. The method according to claim 13, wherein the bio-derived dispersant comprises lecithin and a surfactant having a hydrophilic-lipophilic balance of between 10.0 and 24.0.

15. The method according to claim 13, wherein the bio-derived dispersant comprises lecithin.

16. The method according to claim 13, wherein the pigment is titanium dioxide, aluminum silicate, or a combination thereof.

17. The method according to claim 13, wherein the paint base is aqueous.

18. The method according to claim 13, wherein the paint base is non-aqueous.

* * * * *